(12) United States Patent
Daruwalla et al.

(10) Patent No.: US 7,966,409 B1
(45) Date of Patent: Jun. 21, 2011

(54) ROUTING PROTOCOL BASED REDUNDANCY DESIGN FOR SHARED-ACCESS NETWORKS

(75) Inventors: Feisal Daruwalla, Santa Clara, CA (US); James R. Forster, Los Altos, CA (US); Guenter E. Roeck, San Jose, CA (US); Richard M. Woundy, North Reading, MA (US); Michael A. Thomas, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 972 days.

(21) Appl. No.: 10/899,668

(22) Filed: Jul. 26, 2004

Related U.S. Application Data

(63) Continuation of application No. 09/484,189, filed on Jan. 18, 2000, now Pat. No. 6,839,829.

(51) Int. Cl.
 *G06F 15/16* (2006.01)
(52) U.S. Cl. .................................. 709/228; 725/111
(58) Field of Classification Search .................. 709/227, 709/221, 222, 228; 725/109, 111
 See application file for complete search history.

(56) References Cited

U.S. PATENT DOCUMENTS

| | | | |
|---|---|---|---|
| 4,692,918 A | 9/1987 | Elliott et al. | |
| 4,827,411 A | 5/1989 | Arrowood et al. | |
| 4,965,772 A | 10/1990 | Daniel et al. | |
| 5,016,244 A | 5/1991 | Massey, Jr. et al. | |
| 5,018,133 A | 5/1991 | Tsukakoshi et al. | |
| 5,218,600 A | 6/1993 | Schenkyr et al. | |
| 5,315,592 A | 5/1994 | Conant et al. | |
| 5,371,852 A | 12/1994 | Attanasio et al. | |
| 5,414,704 A | 5/1995 | Spinney | |
| 5,423,002 A | 6/1995 | Hart | |
| 5,452,447 A | 9/1995 | Nelson et al. | |
| 5,473,599 A | 12/1995 | Li et al. | |
| 5,488,412 A | 1/1996 | Majeti et al. | |

(Continued)

FOREIGN PATENT DOCUMENTS

WO 95/029544 11/1995

(Continued)

OTHER PUBLICATIONS

K. Egevang et al., "The IP Network Address Translator (NAT)", Network Working Group, pp. 1-10, May 1994.

(Continued)

*Primary Examiner* — Kevin Bates
*Assistant Examiner* — Jeffrey Nickerson
(74) *Attorney, Agent, or Firm* — Weaver Austin Villeneuve & Sampson LLP

(57) ABSTRACT

A protection CMTS is available to immediately service a cable modem should that modem's service from a working CMTS fail for any reason. To speed the service transfer (cutover) from the working CMTS to the protection CMTS, the cable modem may preregister with the protection CMTS well before the cutover becomes necessary. The cable modem's registration with both the working CMTS and the protection CMTS preferably employs a single IP address, so that the cable modem need not obtain a new IP address during cutover. While the cable modem may register with both the working CMTS and the protection CMTS, the devices are designed or configured so that only the working CMTS injects a host route for the cable modem into the appropriate routing protocol. Only after cutover to the protection CMTS does the protection CMTS inject its host route.

39 Claims, 15 Drawing Sheets

U.S. PATENT DOCUMENTS

| | | | |
|---|---|---|---|
| 5,506,987 A | 4/1996 | Abramson et al. | |
| 5,511,208 A | 4/1996 | Boyles et al. | |
| 5,515,429 A | 5/1996 | Kawada et al. | |
| 5,541,911 A | 7/1996 | Nilakantan et al. | |
| 5,544,320 A | 8/1996 | Konrad | |
| 5,555,244 A | 9/1996 | Gupta et al. | |
| 5,572,528 A | 11/1996 | Shuen | |
| 5,586,121 A | 12/1996 | Moura et al. | |
| 5,611,049 A | 3/1997 | Pitts | |
| 5,619,552 A | 4/1997 | Karppanen et al. | |
| 5,644,713 A | 7/1997 | Makishima | |
| 5,644,720 A | 7/1997 | Boll et al. | |
| 5,673,265 A | 9/1997 | Gupta et al. | |
| 5,729,537 A | 3/1998 | Billstrom | |
| RE35,774 E | 4/1998 | Moura et al. | |
| 5,740,375 A | 4/1998 | Dunne et al. | |
| 5,751,971 A | 5/1998 | Dobbins et al. | |
| 5,774,660 A | 6/1998 | Brandel et al. | |
| 5,787,470 A | 7/1998 | DiSimone et al. | |
| 5,793,763 A | 8/1998 | Mayes et al. | |
| 5,818,845 A | 10/1998 | Moura et al. | |
| 5,825,759 A | 10/1998 | Liu | |
| 5,828,655 A | 10/1998 | Moura et al. | |
| 5,835,696 A * | 11/1998 | Hess | 714/10 |
| 5,848,241 A | 12/1998 | Misinai et al. | |
| 5,852,717 A | 12/1998 | Bhide et al. | |
| 5,859,852 A | 1/1999 | Moura et al. | |
| 5,862,345 A | 1/1999 | Okanoue et al. | |
| 5,862,451 A | 1/1999 | Grau et al. | |
| 5,872,773 A | 2/1999 | Katzela et al. | |
| 5,892,903 A | 4/1999 | Klaus | |
| 5,940,596 A | 8/1999 | Rajan et al. | |
| 5,943,604 A | 8/1999 | Chen et al. | |
| 5,946,047 A | 8/1999 | Levan | |
| 5,946,048 A | 8/1999 | Levan | |
| 5,949,753 A | 9/1999 | Alexander, Jr. et al. | |
| 5,950,205 A | 9/1999 | Aviani, Jr. | |
| 5,953,335 A | 9/1999 | Ermili et al. | |
| 5,956,346 A | 9/1999 | Levan | |
| 5,959,660 A | 9/1999 | Levan | |
| 5,959,968 A | 9/1999 | Chin et al. | |
| 5,959,997 A | 9/1999 | Moura et al. | |
| 5,963,540 A | 10/1999 | Bhaskaran | |
| 5,982,745 A | 11/1999 | Wolff et al. | |
| 5,989,060 A | 11/1999 | Coile et al. | |
| 5,996,016 A | 11/1999 | Thalheimer et al. | |
| 5,996,021 A | 11/1999 | Civaniar et al. | |
| 5,999,536 A | 12/1999 | Kawafuji et al. | |
| 6,006,264 A | 12/1999 | Colby et al. | |
| 6,006,266 A | 12/1999 | Murphy et al. | |
| 6,016,388 A | 1/2000 | Dillon | |
| 6,052,718 A | 4/2000 | Gifford | |
| 6,058,425 A | 5/2000 | White | |
| 6,061,650 A | 5/2000 | Malkin et al. | |
| 6,065,061 A | 5/2000 | Blahut et al. | |
| 6,073,168 A | 6/2000 | Migdoll et al. | |
| 6,078,575 A | 6/2000 | Dommety et al. | |
| 6,088,721 A | 7/2000 | Lin et al. | |
| 6,092,178 A | 7/2000 | Jindal et al. | |
| 6,097,882 A | 8/2000 | Mogul | |
| 6,108,300 A * | 8/2000 | Coile et al. | 370/217 |
| 6,111,675 A | 8/2000 | Mao et al. | |
| 6,128,666 A | 10/2000 | Muller et al. | |
| 6,131,121 A | 10/2000 | Mattaway et al. | |
| 6,148,000 A * | 11/2000 | Feldman et al. | 370/397 |
| 6,148,410 A * | 11/2000 | Baskey et al. | 714/4 |
| 6,157,965 A | 12/2000 | Mohammed et al. | |
| 6,167,438 A | 12/2000 | Yates et al. | |
| 6,167,446 A | 12/2000 | Lister et al. | |
| 6,173,312 B1 | 1/2001 | Atarashi et al. | |
| 6,178,455 B1 * | 1/2001 | Schutte et al. | 709/228 |
| 6,182,139 B1 | 1/2001 | Brendel | |
| 6,189,043 B1 | 2/2001 | Buyukkoc et al. | |
| 6,189,102 B1 * | 2/2001 | Beser | 726/2 |
| 6,195,689 B1 * | 2/2001 | Bahlmann | 709/217 |
| 6,195,705 B1 | 2/2001 | Lueng | |
| 6,202,169 B1 | 3/2001 | Razzaghe-Ashrafi et al. | |
| 6,205,481 B1 | 3/2001 | Heddaya et al. | |
| 6,227,785 B1 | 5/2001 | Kilgore | |
| 6,230,196 B1 | 5/2001 | Guenthner et al. | |
| 6,230,326 B1 | 5/2001 | Unger et al. | |
| 6,236,678 B1 | 5/2001 | Horton et al. | |
| 6,240,089 B1 | 5/2001 | Okanoue et al. | |
| 6,240,461 B1 | 5/2001 | Cieslak et al. | |
| 6,243,360 B1 | 6/2001 | Basilico | |
| 6,243,760 B1 | 6/2001 | Armbruster et al. | |
| 6,247,054 B1 | 6/2001 | Malkin | |
| 6,249,820 B1 | 6/2001 | Dobbins et al. | |
| 6,253,234 B1 | 6/2001 | Hunt et al. | |
| 6,260,070 B1 | 7/2001 | Shah | |
| 6,286,038 B1 * | 9/2001 | Reichmeyer et al. | 709/220 |
| 6,286,084 B1 | 9/2001 | Wexler et al. | |
| 6,292,832 B1 | 9/2001 | Shah et al. | |
| 6,295,276 B1 | 9/2001 | Datta et al. | |
| 6,298,063 B1 | 10/2001 | Coile | |
| 6,298,381 B1 | 10/2001 | Shah et al. | |
| 6,301,223 B1 | 10/2001 | Hrastar et al. | |
| 6,324,564 B1 | 11/2001 | Thieke et al. | |
| 6,327,622 B1 | 12/2001 | Jindal et al. | |
| 6,330,602 B1 | 12/2001 | Law et al. | |
| 6,330,606 B1 | 12/2001 | Logue et al. | |
| 6,339,830 B1 | 1/2002 | See et al. | |
| 6,345,294 B1 | 2/2002 | O'Toole et al. | |
| 6,370,147 B1 | 4/2002 | Beser | |
| 6,377,972 B1 | 4/2002 | Guo et al. | |
| 6,385,204 B1 * | 5/2002 | Hoefelmeyer et al. | 370/401 |
| 6,389,027 B1 | 5/2002 | Lee et al. | |
| 6,389,462 B1 | 5/2002 | Cohen et al. | |
| 6,397,260 B1 | 5/2002 | Wils et al. | |
| 6,415,323 B1 | 7/2002 | McCanne et al. | |
| 6,434,608 B1 | 8/2002 | Desai | |
| 6,438,123 B1 | 8/2002 | Chapman | |
| 6,438,652 B1 | 8/2002 | Jordan et al. | |
| 6,442,558 B1 | 8/2002 | Brown et al. | |
| 6,446,121 B1 | 9/2002 | Shah et al. | |
| 6,449,249 B1 | 9/2002 | Cloonan et al. | |
| 6,449,250 B1 | 9/2002 | Otani et al. | |
| 6,463,475 B1 | 10/2002 | Calhoun | |
| 6,466,964 B1 | 10/2002 | Leung et al. | |
| 6,470,027 B1 | 10/2002 | Birrell, Jr. | |
| 6,470,389 B1 | 10/2002 | Chung et al. | |
| 6,473,802 B2 | 10/2002 | Masters | |
| 6,477,197 B1 | 11/2002 | Unger | |
| 6,477,522 B1 | 11/2002 | Young | |
| 6,480,469 B1 | 11/2002 | Moore et al. | |
| 6,487,591 B1 * | 11/2002 | Budhraja et al. | 709/223 |
| 6,487,605 B1 | 11/2002 | Leung | |
| 6,493,318 B1 | 12/2002 | Bare | |
| 6,499,088 B1 | 12/2002 | Wexler et al. | |
| 6,505,254 B1 | 1/2003 | Johnson et al. | |
| 6,510,162 B1 | 1/2003 | Fijolek et al. | |
| 6,510,469 B1 | 1/2003 | Starnes et al. | |
| 6,512,774 B1 | 1/2003 | Vepa et al. | |
| 6,519,646 B1 | 2/2003 | Gupta et al. | |
| 6,532,493 B1 | 3/2003 | Aviani et al. | |
| 6,553,568 B1 * | 4/2003 | Fijolek et al. | 725/111 |
| 6,556,591 B2 | 4/2003 | Bernath et al. | |
| 6,577,642 B1 | 6/2003 | Fijolek et al. | |
| 6,578,066 B1 | 6/2003 | Logan et al. | |
| 6,578,077 B1 | 6/2003 | Rakoshitz et al. | |
| 6,588,016 B1 | 7/2003 | Chen et al. | |
| 6,594,305 B1 * | 7/2003 | Roeck et al. | 375/222 |
| 6,598,232 B1 * | 7/2003 | McAlear | 725/126 |
| 6,606,315 B1 | 8/2003 | Albert et al. | |
| 6,606,352 B2 | 8/2003 | Horton et al. | |
| 6,611,868 B1 | 8/2003 | Arutyonov | |
| 6,621,810 B1 | 9/2003 | Leung | |
| 6,633,585 B1 | 10/2003 | Ghanwani et al. | |
| 6,636,498 B1 | 10/2003 | Leung | |
| 6,636,971 B1 | 10/2003 | Loukianov | |
| 6,650,624 B1 | 11/2003 | Quigley et al. | |
| 6,650,641 B1 | 11/2003 | Albert et al. | |
| 6,665,304 B2 | 12/2003 | Beck et al. | |
| 6,671,259 B1 | 12/2003 | He et al. | |
| 6,674,713 B1 * | 1/2004 | Berg et al. | 370/217 |
| 6,683,873 B1 | 1/2004 | Kwok et al. | |
| 6,687,217 B1 * | 2/2004 | Chow et al. | 370/217 |

| | | | |
|---|---|---|---|
| 6,691,165 B1 | 2/2004 | Bruck et al. | |
| 6,724,724 B1 | 4/2004 | Swenson et al. | |
| 6,728,748 B1 | 4/2004 | Mangipudi et al. | |
| 6,735,631 B1 | 5/2004 | Oehrke et al. | |
| 6,742,044 B1 | 5/2004 | Aviani et al. | |
| 6,751,191 B1* | 6/2004 | Kanekar et al. | 370/217 |
| 6,760,302 B1* | 7/2004 | Ellinas et al. | 370/228 |
| 6,760,316 B1 | 7/2004 | Hebsgaard et al. | |
| 6,765,892 B1 | 7/2004 | Leung et al. | |
| 6,768,743 B1* | 7/2004 | Borella et al. | 370/401 |
| 6,779,039 B1 | 8/2004 | Bommareddy et al. | |
| 6,789,125 B1 | 9/2004 | Aviani et al. | |
| 6,795,857 B1 | 9/2004 | Leung et al. | |
| 6,795,860 B1 | 9/2004 | Shah | |
| 6,801,949 B1 | 10/2004 | Bruck et al. | |
| 6,804,221 B1 | 10/2004 | Magret et al. | |
| 6,826,599 B1 | 11/2004 | Shaffer et al. | |
| 6,832,252 B1 | 12/2004 | Cieslak et al. | |
| 6,835,696 B2 | 12/2004 | Saito et al. | |
| 6,839,809 B1 | 1/2005 | Forster et al. | |
| 6,839,829 B1 | 1/2005 | Daruwalla | |
| 6,857,026 B1* | 2/2005 | Cain | 709/239 |
| 6,920,498 B1 | 7/2005 | Gourlay et al. | |
| 6,952,401 B1 | 10/2005 | Kadambie et al. | |
| 6,981,056 B1 | 12/2005 | Aviani et al. | |
| 7,006,431 B1 | 2/2006 | Kenakar et al. | |
| 7,039,720 B2 | 5/2006 | Alfieri et al. | |
| 7,062,570 B2 | 6/2006 | Hong et al. | |
| 7,065,043 B2 | 6/2006 | Wu et al. | |
| 7,065,779 B1* | 6/2006 | Crocker et al. | 725/111 |
| 7,072,979 B1 | 7/2006 | Aviani et al. | |
| 7,111,061 B2 | 9/2006 | Leighton et al. | |
| 7,117,273 B1 | 10/2006 | Toole et al. | |
| 7,136,383 B1 | 11/2006 | Wilson | |
| 7,143,195 B2 | 11/2006 | Vange et al. | |
| 7,149,217 B2 | 12/2006 | Alexander et al. | |
| 7,149,771 B1 | 12/2006 | Gifford | |
| 7,151,758 B2 | 12/2006 | Kumaki et al. | |
| 7,162,540 B2 | 1/2007 | Jasen et al. | |
| 7,260,102 B2 | 8/2007 | Mehvar et al. | |
| 7,281,036 B1 | 10/2007 | Lu et al. | |
| 7,349,348 B1 | 3/2008 | Johnson et al. | |
| 7,349,979 B1 | 3/2008 | Cieslak et al. | |
| 7,395,348 B1 | 7/2008 | Cieslak et al. | |
| 7,401,159 B1 | 7/2008 | Aviani et al. | |
| 7,593,346 B2 | 9/2009 | McLaggan et al. | |
| 7,702,732 B1* | 4/2010 | Squire et al. | 709/206 |
| 2001/0014097 A1 | 8/2001 | Beck et al. | |
| 2001/0042105 A1 | 11/2001 | Koehler et al. | |
| 2001/0049741 A1 | 12/2001 | Skene et al. | |
| 2002/0010783 A1 | 1/2002 | Primak et al. | |
| 2002/0012327 A1 | 1/2002 | Okada | |
| 2002/0019879 A1 | 2/2002 | Jasen et al. | |
| 2002/0023159 A1 | 2/2002 | Vange et al. | |
| 2002/0040400 A1 | 4/2002 | Masters | |
| 2002/0062372 A1 | 5/2002 | Hong et al. | |
| 2002/0099849 A1 | 7/2002 | Alfieri et al. | |
| 2002/0120697 A1 | 8/2002 | Generous et al. | |
| 2002/0129134 A1 | 9/2002 | Leighton et al. | |
| 2002/0191562 A1 | 12/2002 | Kumaki et al. | |
| 2003/0014540 A1 | 1/2003 | Sultan et al. | |
| 2003/0031178 A1 | 2/2003 | Haeri et al. | |
| 2003/0037165 A1 | 2/2003 | Shinomiya et al. | |
| 2003/0133420 A1 | 7/2003 | Haddad | |
| 2003/0161303 A1 | 8/2003 | Mehvar et al. | |
| 2004/0071141 A1 | 4/2004 | Dhara et al. | |
| 2005/0111352 A1 | 5/2005 | Ho et al. | |
| 2005/0213832 A1 | 9/2005 | Schofield et al. | |
| 2006/0251097 A1* | 11/2006 | Chapman et al. | 370/431 |
| 2006/0262722 A1* | 11/2006 | Chapman et al. | 370/229 |
| 2008/0120433 A1 | 5/2008 | Cieslak et al. | |

FOREIGN PATENT DOCUMENTS

| | | |
|---|---|---|
| WO | 98/31107 | 7/1998 |
| WO | 2005/018176 | 2/2005 |

OTHER PUBLICATIONS

Y. Rekhter, et al, "*Address Allocation for Private Internets*," RFC: 1918, Network Working Group, Feb. 1996, 9 Pages.

P. Srisuresh, et al, "*Load Sharing Using IP Network Address Translation (LSNAT)*," RFC: 2391, Network Working Group, Aug. 1998, 18 Pages.

P. Srisuresh, et al, "*IP Network Address Translator (NAT) Terminology and Considerations* ," RFC: 2663, Network Working Group, Aug. 1999, 30 Pages.

E. Gerich, "*Guidelines for Management of IP Address Space*," RFC: 1466, Network Working Group, May 1993, 10 Pages.

Chambless, et al., "Home Agent Redundancy Protocol (HARP)," Oct. 27, 1997.

Network Working Group, RFC 2002 "IP Mobility Support," Oct. 1996.

C.E. Perkins and T. Jagannadh, "DHCP for Mobile Networking with TCP/IP," IBM, Watson Research Center IEEE, Apr. 1995.

3Com Corporation, "Configuring Boundary Routing System Architecture," NETBuilder Family Bridge/Router Release Notes, Mar. 1994, pp. 26-29.

Kanekar, et al., "*Load Sharing and Redundancy Scheme*," U.S. Appl. No. 09/342,589, filed Jun. 29, 1999, 75 Pages.

Zang, et al. "Method for a Cable Modem to Rapidly Switch to a Backup CMTS," U.S. Appl. No. 09/484,611, filed Jan. 18, 2000, 53 Pages.

Zang, et al. "Cable Network Redundancy Architecture," U.S. Appl. No. 09/484,612, filed Jan. 18, 2000, 60 Pages.

Nosella, et al. "Gateway Load Balancing Protocol," U.S. Appl. No. 09/883,674, filed Jun. 18, 2001, 48 Pages.

Ian Wilson, "Redirection to a Virtual Router," U.S. Appl. No. 09/748,828, filed Dec. 26, 2000, 33 Pages.

Denny, et al. "Stateful Network Address Translation Protocol Implemented Over a Data Network," U.S. Appl. No. 09/735,199, filed Dec. 11, 2000, 67 Pages.

Leung, et al. "Robust HA Redundancy and Load Balancing," U.S. Appl. No. 10/008,494, filed Nov. 9, 2001, 53 Pages.

Kent Leung, "Mobile IP Mobility Agent Standby Protocol," U.S. Appl. No. 09/714,466, filed Nov. 14, 2000, 51 Pages.

Release notes for 3Com Corporation, "NETBuilder Family Bridge/ Router", pp. 27-29, (Mar. 1994).

J. Moy, RFC 1247 "OSPF Version 2", Jul. 19, 1991.

D. Oran, RFC 1142 "OSI IS-IS Intra-domain Routing Protocol", Feb. 1990.

Black, Uyless, "TCP/IP and Related Protocols", McGraw-Hill, Inc., pp. 226-249, 1992.

Kent K. Leung, "Mobile IP Mobility Agent Standby Protocol", U.S. Appl. No. 09/107,701, filed Nov. 14, 2000, 51 Pages.

T. Li, et al., RFC 2281 "Cisco Hot Standby Router Protocol (HSRP)," Mar. 1998.

Office Action dated Mar. 17, 1995 for U.S. Appl. No. 08/231,330.

Notice of Allowance dated Jul. 24, 1995 for U.S. Appl. No. 08/231,330.

International Search Report mailed on Aug. 24, 1995 for PCT Application No. PCT/US1995/04887.

Office Action dated Feb. 2, 2000 for U.S. Appl. No. 09/107,701.

Notice of Allowance dated Aug. 14, 2000 for U.S. Appl. No. 09/107,701.

Release notes for 3Com Corporation, "Conducting a Redundant Route for Network Resiliency," *NETBuilder Family Bridge/Router Release*, Mar. 1994, pp. 26-29.

Office Action for U.S. Appl. No. 09/714,466 dated Jun. 4, 2001.

Office Action for U.S. Appl. No. 09/714,466 dated Nov. 27, 2001.

Notice of Allowance for U.S. Appl. No. 09/714,466 dated May 21, 2002.

Eager et al., "Adaptive Load Sharing in Homogeneous Distributed Systems," IEEE, Transactions on Software Engineering, vol. Se-12, No. 5, May 1986, pp. 662-675.

Akamai Technologies, Inc. -Global Internet Content Delivery- "How Free Flow Works," webmaster@akamai.com 1999-2000.

Internap, "Preferred Collocation Services," http://www.intemap.com Copyright © 2001 Internap Network Services Corporation.

Meyer et al., "Request for Comments No. 2026, entitled, " Generic Routing Encapsulation (GRE), Jan. 2000, Internet Engineering Task Force, 9 pages.

Mockapetris, P. Request for Comments No. 1034, entitled, "Domain Name-Concepts and Facilities," Nov. 1987, Internet Engineering Task Force, 37 pages.
Kirk Johnson, "A Method and Apparatus for Minimalist Approach to Implementing Server Selection," U.S. Appl. No. 60/177,415, filed Jan. 21, 2000, 39 pages.
Office Action dated Nov. 15, 2002 for U.S. Appl. No. 09/342,859.
Final Office Action dated May 7, 2003 for U.S. Appl. No. 09/342,859.
Notice of Allowance dated Aug. 4, 2003 for U.S. Appl. No. 09/342,859.
Supplemental Notice of Allowance dated Oct. 3, 2003 for U.S. Appl. No. 09/342,859.
Office Action dated Dec. 15, 2004 for U.S. Appl. No. 10/723,371.
Notice of Allowance dated May 3, 2005 for U.S. Appl. No. 10/723,371.
Supplemental Notice of Allowance dated Sep. 15, 2005 for U.S. Appl. No. 10/723,371.
Office Action dated Mar. 17, 2009 for U.S. Appl. No. 11/190,696, 24 pgs.
Information Sciences Institute, Request for Comments No. 793, entitled, "Transmission Control Protocol—DARPA Internet Program—Protocol Specification," Sep. 1981, Internet Engineering Task Force, 49 pages.
S. Knight et al. "Virtual Redundancy Protocol", Apr. 1998, IETF, RFC 2338.
Office action dated Nov. 18, 2002 for U.S. Appl. No. 09/484,189.
Final Office action dated Apr. 21, 2003 for U.S. Appl. No. 09/484,189.
Office action dated Dec. 8, 2003 for U.S. Appl. No. 09/484,189.
Notice of Allowance dated Apr. 15, 2004 for U.S. Appl. No. 09/484,189.
Office Action dated Feb. 12, 2003 for U.S. Appl. No. 09/484,911.
Office Action dated Mar. 18, 2003 for U.S. Appl. No. 09/484,911.
Final Office Action dated Aug. 15, 2003 for U.S. Appl. No. 09/484,911.
Office Action dated Jan. 21, 2004 for U.S. Appl. No. 09/484,911.
Final Office Action dated Aug. 10, 2004 for U.S. Appl. No. 09/484,911.
Office Action dated Feb. 16, 2005 for U.S. Appl. No. 09/484,911.
Office Action dated Jul. 19, 2005 for U.S. Appl. No. 09/484,911.
Notice of Allowance dated Jan. 5, 2006 for U.S. Appl. No. 09/484,911
Office Action dated Jan. 31, 2008 for U.S. Appl. No. 11/636,725.
Final Office Action dated Sep. 26, 2008 for U.S. Appl. No. 11/636,725.
Office Action dated Nov. 6, 2002 for U.S. Appl. No. 09/484,612.
Office Action dated Apr. 25, 2003 for U.S. Appl. No. 09/484,612.
Office Action dated Nov. 6, 2003 for U.S. Appl. No. 09/484,612.
Office Action dated Mar. 10, 2004 for U.S. Appl. No. 09/484,612.
Office Action dated Sep. 16, 2004 for U.S. Appl. No. 09/484,612.
Notice of Allowance dated Jun. 3, 2005 for U.S. Appl. No. 09/484,612
Notice of Allowance dated Nov. 22, 2005 for U.S. Appl. No. 09/484,612.
Office Action dated Apr. 10, 2003 for U.S. Appl. No. 09/476,188.
Notice of Allowance dated Sep. 8, 2003 for U.S. Appl. No. 09/476,188.
Valloppillil, Vinod, "Cache Array Routing Protocol v1.0", Oct. 20, 1997, Internet-Draft, http://ds1.internic/net/internet-drafts/draft-vinod-carp-v1-02.txt, pp. 1-6.
Cisco Technology, Inc., "Configuring IP Routing Protocols," Dec. 10, 1997, http://www.cisco.com/univercd/data/doc/software/11_2/cnp1/5ciprout.htm#R EF40277, pp. 1-6, 120-122.
Ousterhout, John K., "*A Trace-Driven Analysis of the UNIX 4.2 BSD File System*," Computer Science Division, Electrical Engineering and Computer ScienceUniversity of California, Berkeley, CA, pp. 1-12.
Welch, Brent, "*A Comparison of the Vnode and Sprite File System Architectures*," Proceedings of the File System Workshop, May 1992, pp. 29-44.

Ousterhout, John K., "*Beating the I/O Bottleneck: A Case for Log-Structured File Systems*," Jan. 30, 1992, *Computer Science Division, Electrical Engineering anc Computer Sciences*, University of California, Berkeley, CA, pp. 1-17.
Martin Arlitt, Ludmila Cherkasova, John Dilley, Rich Friedrich and Tai Jin, of Hewlett-Packard Laboratories, "*Evaluating Content Management Techniques for Web Proxy Caches*," Apr. 30, 1999, 9 pages.
Cardellini et al., "Dynamic Load Balancing on Web-Server Systems," *Internet Computing, IEEE*, May-Jun. 1993, vol. 3, Issue 3, pp. 28-39.
Asit Dan et al., "Multimedia Caching Strategies for Heterogeneous Application and Server Environments," *Multimedia Tools and Application*, May 1997, vol. 4, No. 3, pp. 379-312.
Gibson et al., "File Server Scaling with Network-Attached Secure Disks," *Association for Computing Machinery*, 1997, pp. 272-284.
Pai et al., "Locality-Aware Request Distribution in Cluster-based Network Servers," *Association for Computing Machinery*, 1998, pp. 205-216.
Perkins et al., "Route Optimization for Mobile IP," *Cluster Computing*, Jun. 1998 vol. 1, No. 2, pp. 161-176.
Office Action dated Oct. 14, 2003 for U.S. Appl. No. 09/606,418.
Notice of Allowance dated Feb. 10, 2004 for U.S. Appl. No. 09/606,418.
Office Action dated Dec. 2, 2003 for U.S. Appl. No. 09/608,802.
Office Action dated Mar. 15, 2004 for U.S. Appl. No. 09/608,802.
Final Office Action dated Dec. 1, 2004 for U.S. Appl. No. 09/608,802.
Office Action dated Sep. 20, 2005 for U.S. Appl. No. 09/608,802.
Final Office Action dated Mar. 2, 2006 for U.S. Appl. No. 09/608,802.
Office Action dated Sep. 6, 2006 for U.S. Appl. No. 09/608,802.
Final Office Action dated Jan. 30, 2007 for U.S. Appl. No. 09/608,802.
Notice of Allowance dated Oct. 25, 2007 for U.S. Appl. No. 09/608,802.
Gourlay et al., "Path Selection System," Filed: Dec. 19, 2001, U.S. Appl. No. 10/034,368.
Office Action dated Apr. 15, 2003 for U.S. Appl. No. 09/569,090.
Final Office Action dated Oct. 1, 2003 for U.S. Appl. No. 09/569,090.
Notice of Allowance dated Jan. 9, 2004 for U.S. Appl. No. 09/569,090.
Supplemental Notice of Allowance dated Mar. 12, 2004 for U.S. Appl. No. 09/569,090.
Office Action for dated Sep. 24, 2007 U.S. Appl. No. 10/851,456.
Notice of Allowance dated Mar. 7, 2008 for U.S. Appl. No. 10/851,456.
Office Action dated Oct. 6, 2003 for U.S. Appl. No. 09/569,083.
Interview Summary dated Jan. 30, 2004 for U.S. Appl. No. 09/569,083.
Notice of Allowance dated Apr. 29, 2004 for U.S. Appl. No. 09/569,083.
Office Action dated Aug. 13, 2003 for U.S. Appl. No. 09/605,917.
Final Office Action dated Feb. 2, 2004 for U.S. Appl. No. 09/605,917.
Final Office Action dated Apr. 27, 2005 for U.S. Appl. No. 09/605,917.
Notice of Allowance dated Aug. 18, 2005 for U.S. Appl. No. 09/605,917.
Office Action dated May 3, 2005 for U.S. Appl. No. 09/883,674.
Final Office Action dated Sep. 20, 2005 for U.S. Appl. No. 09/883,674.
Final Office Action dated Dec. 21, 2005, 2005 for U.S. Appl. No. 09/883,674.
Office Action dated Feb. 13, 2006 for U.S. Appl. No. 09/883,674.
International Search Report and Written Opinion mailed on Jul. 10, 2004 for PCT Application No. PCT/US2004/019617.
Office Action dated Apr. 20, 2004 for U.S. Appl. No. 09/748,828.
Notice of Allowance dated Dec. 21, 2004 for U.S. Appl. No. 09/748,828.
Office Action dated Nov. 29, 2005 for U.S. Appl. No. 11/083,727.
Final Office Action dated Apr. 4, 2006 for U.S. Appl. No. 11/083,727.
Notice of Allowance dated Jun. 30, 2006 for U.S. Appl. No. 11/083,727.
Office Action dated May 2, 2006 for U.S. Appl. No. 10/008,494.

Final Office Action dated Oct. 4, 2006 for U.S. Appl. No. 10/008,494.
Notice of Allowance dated Jan. 26, 2007 for U.S. Appl. No. 10/008,494.
Notice of Allowance dated Mar. 27, 2007 for U.S. Appl. No. 10/008,494.
Office Action dated Jan. 7, 2008 from EP Patent Application No. 04755658.4.
Examination Report dated Oct. 13, 2006 from EP Patent Application No. 04755658.4.
D. Farinacci, et al. Request for Comments No. 2784, entitled, "Generic Routing Encapsulation (GRE)," Jan. 2000, Network Working Group.
Office Action dated Nov. 14, 2008 for Chinese Patent Application No. 200480021154.3.
Office Action dated Mar. 30, 2007 for U.S. Appl. No. 10/632,704.
Office Action dated Oct. 17, 2007 for U.S. Appl. No. 10/632,704.
Final Office Action dated May 9, 2008 for U.S. Appl. No. 10/632,704.
Office Action dated Oct. 17, 2007 for U.S. Appl. No. 10/632,704.
Digital land, Inc. -c-Business Without Limits-, "Enabling Technologies," http://www.digle.net. May 4, 2000.
Office Action dated Jun. 10, 2009 for U.S. Appl. No. 09/883,674.
Office Action dated Jul. 9, 2009 for U.S. Appl. No. 12/020,467.
Notice of Allowance dated Apr. 30, 2009 for U.S. Appl. No. 10/632,704.
Allowed Claims for U.S. Appl. No. 10/632,704.
CN Second Office Action dated May 22, 2009 for Chinese Patent Application No. 200480021154.3.
CN Third Office Action dated Oct. 9, 2009 for Chinese Patent Application No. 200480021154.3.
CN Fourth Office Action dated Mar. 23, 2010 for Chinese Patent Application No. 200480021154.3.
EP Office Action dated Sep. 3, 2009 for EP 04755658.4.
US Final Office Action dated Oct. 15, 2009 for U.S. Appl. No. 11/190,696.
US Notice of Allowance dated Jan. 26, 2010 for U.S. Appl. No. 12/020,467.
US Office Action dated Dec. 10, 2009 for U.S. Appl. No. 09/883,674.
US Office Action dated Jun. 8, 2010, for U.S. Appl. No. 09/883,674.
US Non-Final Office Action dated Sep. 1, 2010 for U.S. Appl. No. 11/190,696.
US Notice of Allowance dated Sep. 23, 2010, for U.S. Appl. No. 09/833,674.

* cited by examiner

ROUTING PROTOCOL BASED REDUNDANCY DESIGN FOR SHARED-ACCESS NETWORKS

CROSS-REFERENCE TO RELATED APPLICATIONS

This application is a continuation of U.S. patent application Ser. No. 09/484,189 filed Jan. 18, 2000 now U.S. Pat. No. 6,839,829 in the name of F. Daruwalla, J. Forster, G. Roeck, R. Woundy, and M. Thomas, and entitled "ROUTING PROTOCOL BASED REDUNDANCY DESIGN FOR SHARED-ACCESS NETWORKS," which is incorporated herein by reference in its entirety and for all purposes.

This invention is related to U.S. patent application Ser. No. 09/484,611, filed on Jan. 18, 2000, naming J. Chapman, J. Zang, and Y. Lu as inventors, and titled "METHOD FOR A CABLE MODEM TO RAPIDLY SWITCH TO A BACKUP CMTS." This application is incorporated herein by reference in its entirety and for all purposes.

BACKGROUND OF THE INVENTION

This invention relates to digital cable network technology. More specifically, it relates to methods and apparatus that provide redundancy for critical headend components of digital cable networks.

Broadband access technologies such as cable, fiber optic, and wireless have made rapid progress in recent years. Recently there has been a convergence of voice and data networks which is due in part to US deregulation of the telecommunications industry. In order to stay competitive, companies offering broadband access technologies need to support voice, video, and other high-bandwidth applications over their local access networks. For networks that use a shared access medium to communicate between subscribers and the service provider (e.g., cable networks, wireless networks, etc.), providing reliable high-quality voice/video communication over such networks is not an easy task.

A cable modem network or "cable plant" employs cable modems, which are an improvement of conventional PC data modems and provide high speed connectivity. Cable modems are therefore instrumental in transforming the cable system into a full service provider of video, voice and data telecommunications services. Digital data on upstream and downstream channels of the cable network is carried over radio frequency ("RF") carrier signals. Cable modems convert digital data to a modulated RF signal for upstream transmission and convert a downstream RF signal to digital form. The conversion is done at a subscriber's home. At a cable modem termination system ("CMTS") located at a head end of the cable network, the conversions are reversed. The CMTS converts downstream digital data to a modulated RF signal, which is carried over the fiber and coaxial lines to the subscriber premises. The cable modem then demodulates the RF signal and feeds the digital data to a computer. On the return path, the digital data is fed to the cable modem (from an associated PC for example), which converts it to a modulated RF signal. Once the CMTS receives the upstream RF signal, it demodulates it and transmits the digital data to an external source.

FIG. 1 is a block diagram of a typical two-way hybrid fiber-coaxial (HFC) cable network system. It shows a head end 102 (essentially a distribution hub) which can typically service about 40,000 homes. Head end 102 contains a CMTS 104 that is needed when transmitting and receiving data using cable modems. Primary functions of the CMTS include (1) receiving signals from external sources 100 and converting the format of those signals, e.g., microwave signals to electrical signals suitable for transmission over the cable system; (2) providing appropriate Media Access Control (MAC) level packet headers for data received by the cable system, and (3) modulating and demodulating the data to and from the cable system.

Head end 102 (and CMTS 104) connects through pairs of fiber optic lines 106 (one line for each direction) to a series of fiber nodes 108. Each head end can support normally up to 80 fiber nodes 108. Pre-HFC cable systems used coaxial cables and conventional distribution nodes. Since a single coaxial cable was capable of transmitting data in both directions, one coaxial cable ran between the head end and each distribution node. In addition, because cable modems were not used, the head end of pre-HFC cable systems did not contain a CMTS. Returning to FIG. 1, each of the fiber nodes 108 is connected by a coaxial cable 110 to two-way amplifiers or duplex filters 112, which permit certain frequencies to go in one direction and other frequencies to go in the opposite direction (different frequency ranges are used for upstream and downstream paths). Each fiber node 108 can normally service up to 500 subscribers. Fiber node 108, coaxial cable 110, two-way amplifiers 112, plus distribution amplifiers 114 along with trunk line 116, and subscriber taps, i.e. branch lines 118, make up the coaxial distribution system of an HFC system. Subscriber tap 118 is connected to a cable modem 120. Cable modem 120 is, in turn, connected to a subscriber computer 122.

According to a current standard for transmission of data over cable networks (termed "DOCSIS"), there is no provision for any redundancy at the CMTS of the cable system. Therefore, a failure of the CMTS will result in a service disruption or service outage of the cable modems relying upon the failed element. If a CMTS fails, for example, it may have to be repaired or replaced before service can resume. This means that service can be out for an extended period. From the perspective of the service provider and the end user, any type of disruption or delay in service is extremely undesirable.

This problem becomes particularly acute as broadband access technologies, including cable, move toward digital telephony (e.g., Voice over IP or "VoIP"). For these applications, rapid reliable cutover from a failed component becomes critical. If such technologies are to compete with analog telephony, a greatly improved protection/cutover technology is necessary.

SUMMARY OF THE INVENTION

To address these issues, the present invention provides a redundancy technique in a shared-access computer network to reduce delays experienced by various elements within the network which may be caused by equipment failure, software failure, or other network problems. The invention provides a protection CMTS available to immediately service a cable modem should that modem's service from a working CMTS fail for any reason. To speed the service transfer (cutover) from the working CMTS to the protection CMTS, the cable modem may preregister with the protection CMTS well before the cutover becomes necessary. The cable modem's registration with both the working CMTS and the protection CMTS preferably employs a single IP address, so that the cable modem need not obtain a new IP address during cutover. Further, to prevent routing conflicts, the working CMTS and the protection CMTS should be designed or configured so that only the working CMTS injects a host route for the cable modem into the appropriate routing protocol. Only after cutover to the protection CMTS should the protection CMTS inject its host route. By employing a redundancy system as described, the cable system can provide telephony service with fewer significant disruptions.

One aspect of the invention provides a method implemented on a working CMTS for providing redundancy to a cable network. In the cable network, the working CMTS provides normal service to a cable modem and a protection CMTS takes over service to the cable modem should service from the working CMTS fail. The method may be characterized by the following sequence: (a) participating in registration of the cable modem to allow servicing of the cable modem by the working CMTS and (b) obtaining an IP address for the cable modem, which IP address is obtained from an address space outside the subnet of the working CMTS. The same IP address should used in communications with both the working CMTS and the protection CMTS. Preferably, the working CMTS and the protection CMTS are routing CMTSs. Also, preferably the address space from which the IP address for the cable modem is obtained lies outside of the subnet for the protection CMTS. In other words, the cable modem IP address is not bound to either the working or protection CMTS interface.

By participating in registration of the cable modem, the working CMTS may perform certain registration functions, In the case of a DOCSIS registration, for example, the CMTS may specify such parameters as a transmission power, a transmission frequency, and transmission time slots at which the cable modem is to communicate with the working CMTS. By participating in registration, the working CMTS may also participate in a process to assign the IP address for the cable modem. Such process may be DHCP and the working CMTS obtains the IP address while performing a DHCP relay function.

In order to allow the protection CMTS to take over service to the cable modem without requiring assignment of a new IP address, the IP address used with the working CMTS must be communicated to the protection CMTS. In one embodiment, this is accomplished by a communication from either the cable modem or working CMTS.

In accordance with this invention, the working CMTS may be expected to inject a host route to the cable modem into a routing protocol. In some headend topologies of this invention, injecting the host route comprises providing the host route to one or more aggregation routers servicing the cable network.

To effect a smooth cutover to the protection CMTS, the working CMTS may also perform the following functions: (c) determining that the working CMTS's service to the cable modem has failed; and (d) notifying at least one of the cable modem and the protection CMTS that the cable modem should obtain service from the protection CMTS. This cutover procedure is particularly useful when the service provided to the cable modem includes telephony service.

Another aspect of the invention provides a CMTS designed or configured to act as a working CMTS for a cable network including the working CMTS and a protection CMTS. The CMTS may be characterized by the following features: (a) one or more processors; (b) memory in communication with at least one of the one or more processors; and (c) registration data for the cable modem. At least one of the processors is configured to store the registration data in memory. The registration data specifies an IP address for the cable modem, which IP address resides in an address space outside the subnet of the working CMTS. Further, the IP address is used for communication with both the working CMTS and the protection CMTS. In addition, the registration data may include such information as a transmission power, transmission time slots, and/or a transmission frequency at which the cable modem is to communicate with the working CMTS. Preferably, the CMTS is a routing CMTS that is configured to implement DOCSIS.

The CMTS should be designed or configured to inject a host route for the cable modem into a routing protocol. It should also be designed or configured to notify at least one of the cable modem and the protection CMTS that the cable modem should obtain service from the protection CMTS when the working CMTS's service to the cable modem has failed.

Yet another aspect of the invention provides a method implemented on a protection CMTS for providing redundancy for a cable network having a working CMTS and the protection CMTS. The method may be characterized by the following sequence: (a) determining that the working CMTS's service to the cable modem has failed; and (b) taking over service to the cable modem while using an IP address for the cable modem that was also used while the working CMTS was servicing the cable modem. As with some of the embodiments discussed above, the IP address for the cable modem preferably resides in an address space located outside the subnet for the working CMTS and also outside the subnet for the protection CMTS.

To determine that the working CMTS's service to the cable modem has failed, the protection CMTS may receive a notification to that effect from at least one of the cable modem and the working CMTS. To take over service to the cable modem, the protection CMTS may request that the cable modem adjust at least one of the following parameters: transmission power, transmission frequency, and transmission time slots.

After taking over service to the cable modem, the protection CMTS may inject a host route to the cable modem, through the protection CMTS, into a routing protocol. This may involve providing the host route to one or more aggregation routers servicing the cable network.

Another aspect of the invention pertains to computer program products including a machine readable medium on which is stored program instructions for implementing the methods as described above. Any of the methods of this invention may be represented as program instructions that can be provided on such computer readable media.

These and other features and advantages of the invention will be presented below with reference to the associated drawings.

DETAILED DESCRIPTION THE PREFERRED EMBODIMENT

A. Topologies Examples

Figure 1:
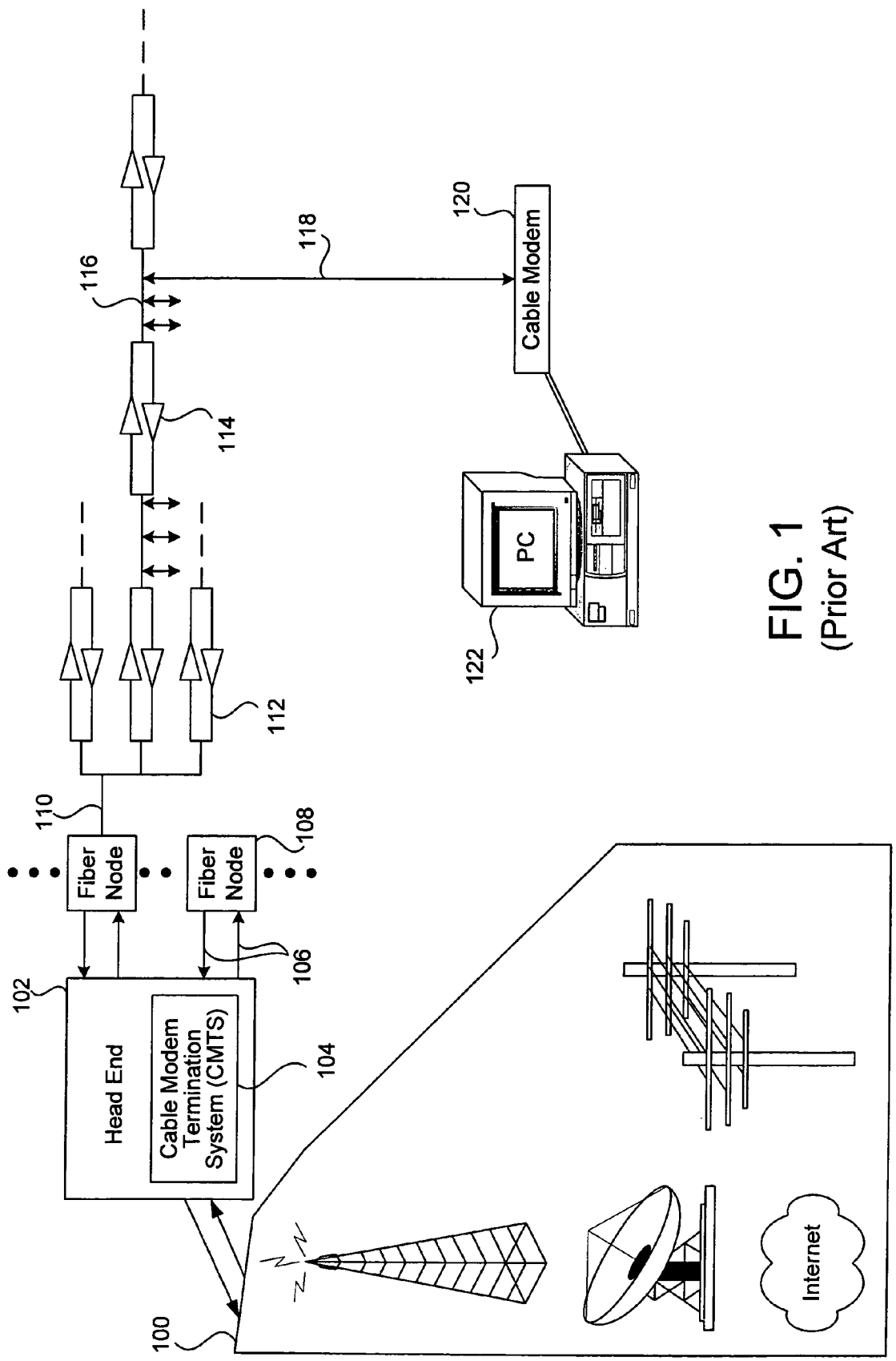
FIG. 1 is a block diagram depicting some of the principal components of a cable network that may be used with the present invention.
Figure 2A:
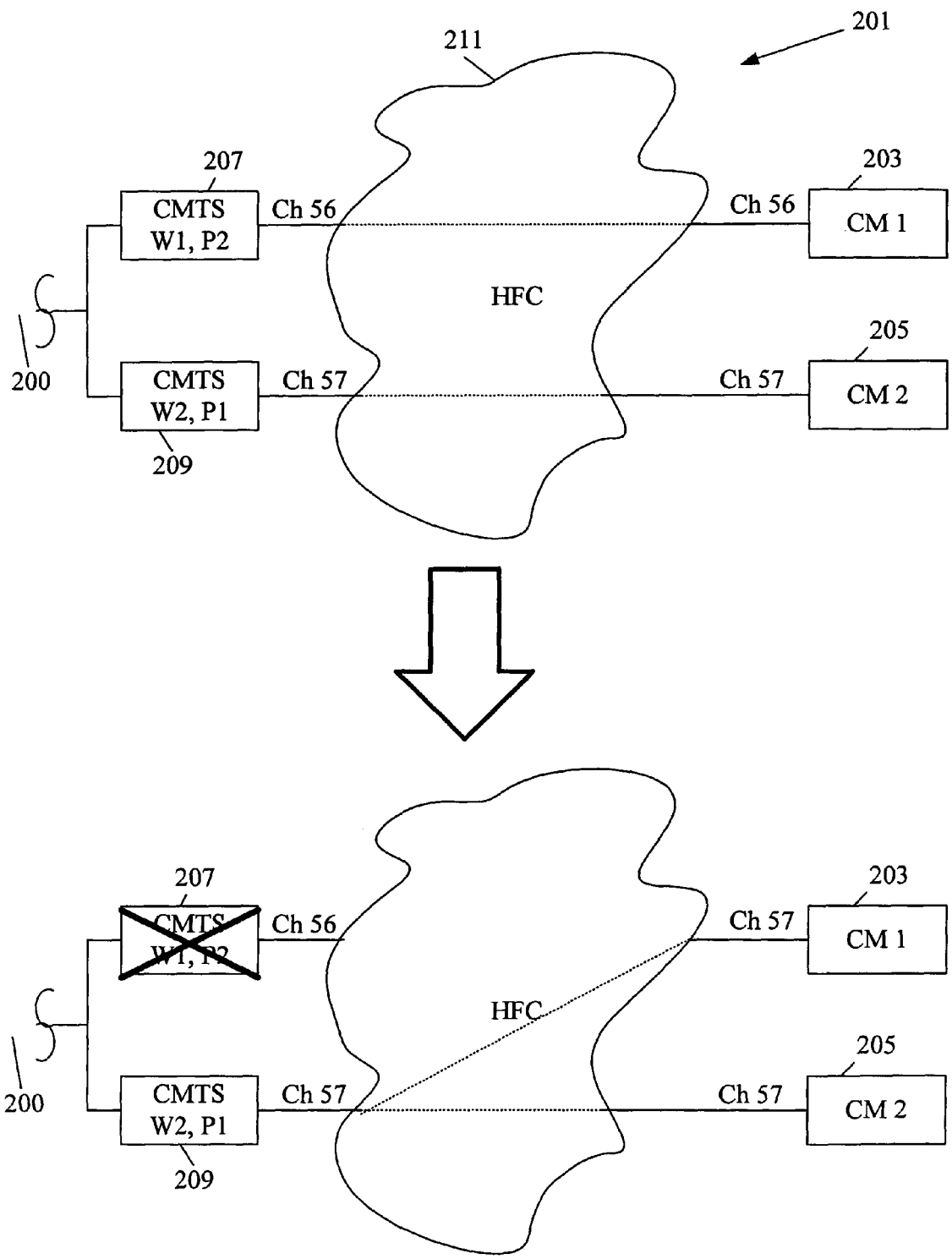
FIG. 2A is a block diagram depicting a cutover procedure using a 1:1 topology in accordance with an embodiment of this invention.

FIGS. 2A-2E present various cable network topologies that may be used in implementing the present invention. FIG. 2A depicts a network topology deemed "1:1" in which the network includes two CMTSs. Both are working CMTSs and both provide protection for the other. Thus, if one of the two CMTSs fails, the other one assumes the functions of the failed CMTS, while maintaining its own functions.

As shown in FIG. 2A, a cable network system 201 includes first and second cable modems 203 and 205. Each connects to a separate CMTS. Specifically, modem 203 connects to a CMTS 207 via a downstream channel 56 and modem 205 connects to a CMTS 209 via a downstream channel 57. Each connection is made through an HFC network 211. Communications between the cable modems and external sources are made via a connection 200.

Note that FIG. 2A is greatly simplified. Normally, a given CMTS or CMTS interface services many cable modems. For example, a single CMTS may handle one or more distribution networks within a cable plant. Thus, cable modems 203 and 205 may represent groups of modems or an entire distribution network having numerous cable modems.

CMTS 207 is given the designation "W1" for working group 1. This means that it is responsible for handling communications with modem 203 and its peers. Similarly, CMTS 209 is designated "W2," as it serves needs of cable modem 205 and possibly many other modems. In accordance with this invention, the CMTSs serve additional roles. CMTS 207 provides a protection path for CMTS 209, while CMTS 209 provides a protection path for CMTS 207. Thus, if CMTS 207 fails or otherwise goes out of service, CMTS 209 will take over responsibility for servicing cable modem 203 and its peers. Likewise, if CMTS 209 fails, CMTS 207 will take over responsibility for cable modem 205 and its peers. Note that this invention is not limited to cases in which a working CMTS "fails." It is also useful for cases where the user simply wants the modems to move to the protection CMTS while the user upgrades or services the working CMTS software, hardware, etc.

FIG. 2A illustrates the failure of CMTS 207. As shown, cable modem 203 can no longer communicate via CMTS 207 and therefore communicates through CMTS 209. To accomplish this, communications to and from cable modem 203 take a different path through HFC network 211. Further, cable modem 203 must shift from downstream channel 56 to channel 57, the channel of CMTS 209. Thus, in this example, cable modem 203 will tune to a different downstream frequency.

Figure 2B:
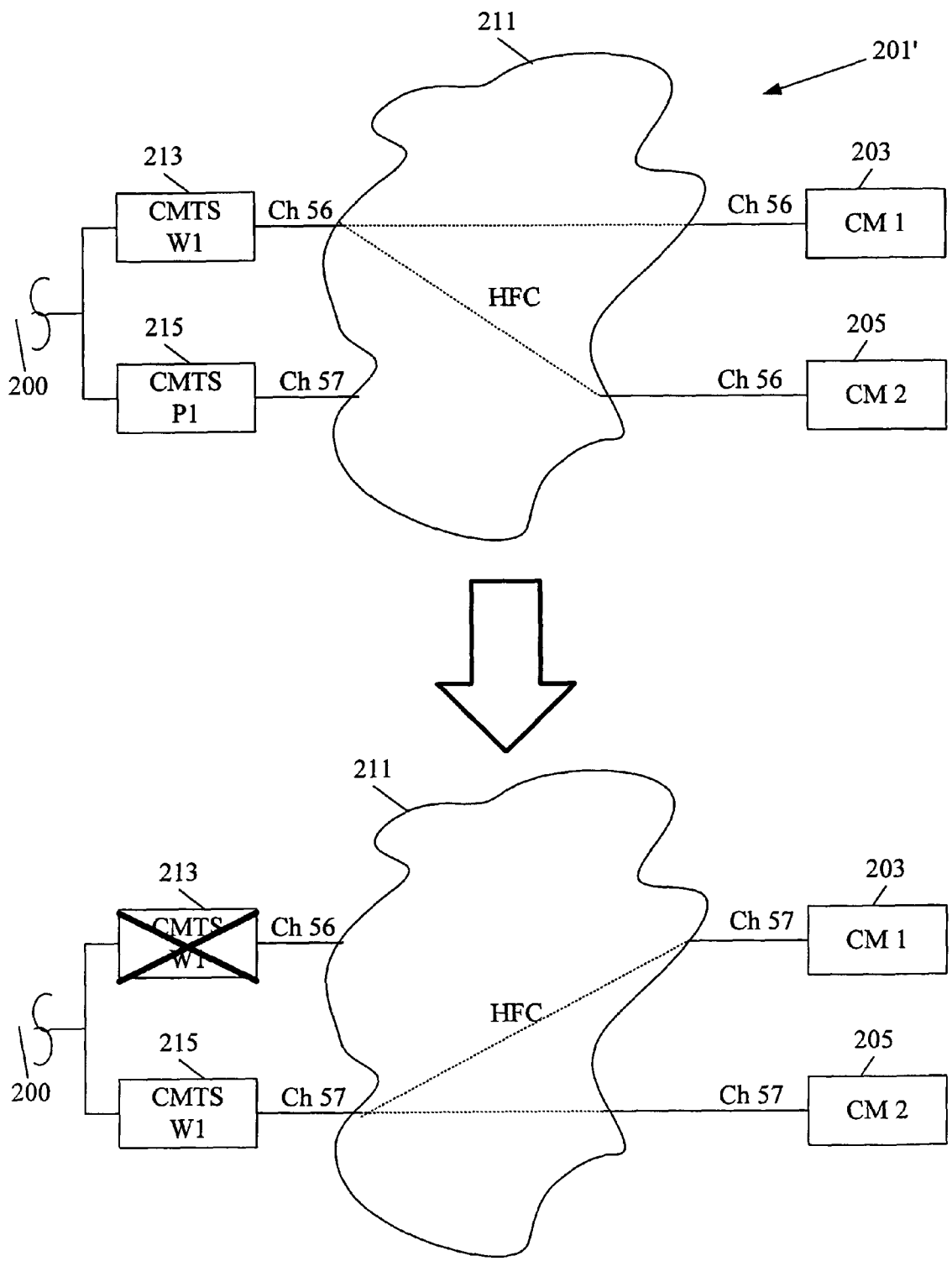
FIG. 2B is a block diagram depicting a cutover procedure using a 1:1 sparing topology in accordance with an embodiment of this invention.

In another topology, deemed "1 for 1 sparing," the network uses two CMTSs: one is a normal working CMTS intended to carry on the normally working functions of a CMTS and another is dedicated to providing protection. In this topology, the protection CMTS does not provide service until the working CMTS fails. It then takes over that machine's functions. FIG. 2B depicts a 1 for 1 sparing topology. As shown, a cable network 201' includes a working CMTS 213 and a protection CMTS 215. Working CMTS provides service to cable modem 203 and cable modem 205, both over channel 56. This is depicted by the connection paths through HFC plant 211. Note that protection CMTS 215 does not normally provide service to any cable modems. It remains available to take over in the case of a failure.

Assume now that working CMTS 213 fails for some reason. Then, cable modems 203 and 205 cannot communicate through it. In the embodiment of FIG. 2B, CMTS 215 takes over the role of CMTS 213. Preferably, the cutover takes place rapidly. It may be necessary for the cable modems to switch from channel 56 to channel 57 during the cutover, as shown.

Figure 2C:
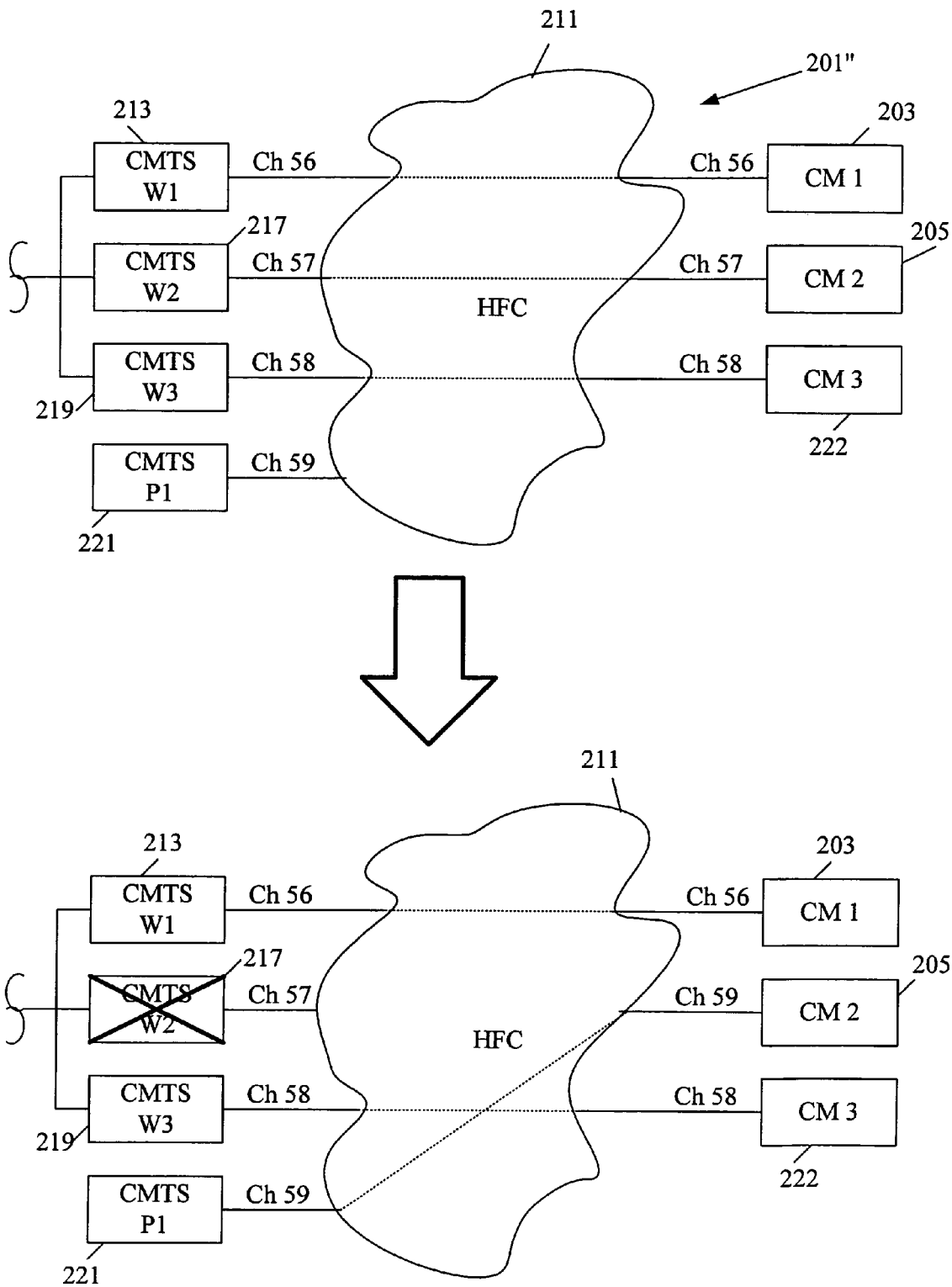
FIG. 2C is a block diagram depicting a cutover procedure employing a 1:N topology in accordance with an embodiment of this invention.

In another embodiment, "1 for N sparing," multiple working CMTSs are protected by a single protection CMTS. The protection CMTS does not provide cable service until one of the N working CMTSs fails. This network topology is depicted in FIG. 2C. As shown, a network 201" includes three working CMTSs: a CMTS 213, a CMTS 217, and a CMTS 219. CMTS 213 provides service to cable modem 203 over channel 56, CMTS 217 provides service to cable modem 205 over channel 57, and CMTS 219 provides service to a cable modem 222 over channel 58. A protection CMTS 221 does not normally service any cable modems but is available to service any cable modem in case it needs to take over for a failed peer. Note that in the depicted topology, protection CMTS 221 is assigned downstream channel 59.

As shown in FIG. 2C, when one of the working CMTSs fails (CMTS 217 in this instance), protection CMTS 221 takes over its role. Here cable modem 205 must begin communicating through protection CMTS 221 over channel 59. Note that the service to cable modems 203 and 222 is not affected. If working CMTS 213 were to fail, protection CMTS 221 would have to take over for it as well. The same is true for working CMTS 219.

In yet another topology, deemed "1:N" service, the cable network includes N+1 working CMTSs, and at least one of these working machines can provide protection for some or all of the other N machines. These approaches have the benefit of making use of all resources during normal operation. That is, the protection CMTS does not sit idle as it must in the "sparing" embodiments. Normally it provides a working path for some of the network modems. However, when a protection/working CMTS is filling in for a failed CMTS, it may have a rather heavy load.

This invention may employ multiple distinct CMTSs to provide redundancy as discussed in much of the discussion herein. Alternatively, a single CMTS may provide both working and protection services. In this alternative embodiment, separate line cards (or more generally interfaces) may provide the various functions. Depending upon the network topology, one or more CMTS interfaces may provide the cutover protection and one or more interfaces may provide normal working service. In one embodiment, if one interface fails another one on the same CMTS can take over for it.

Figure 2D:
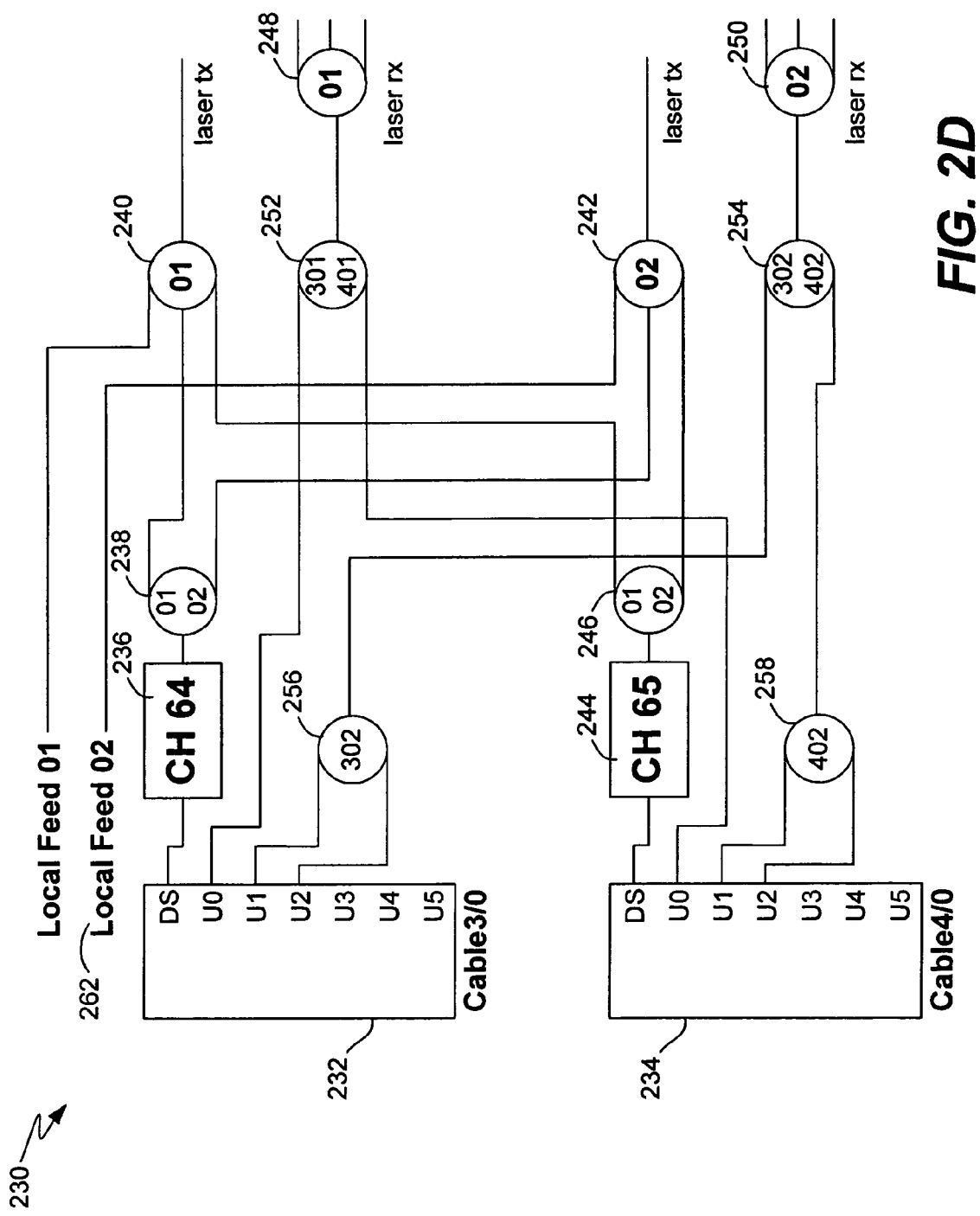
FIG. 2D is a detailed block diagram of a cable network head-end implementing a 1:1 redundancy topology in accordance with an embodiment of this invention.
Figure 2E:
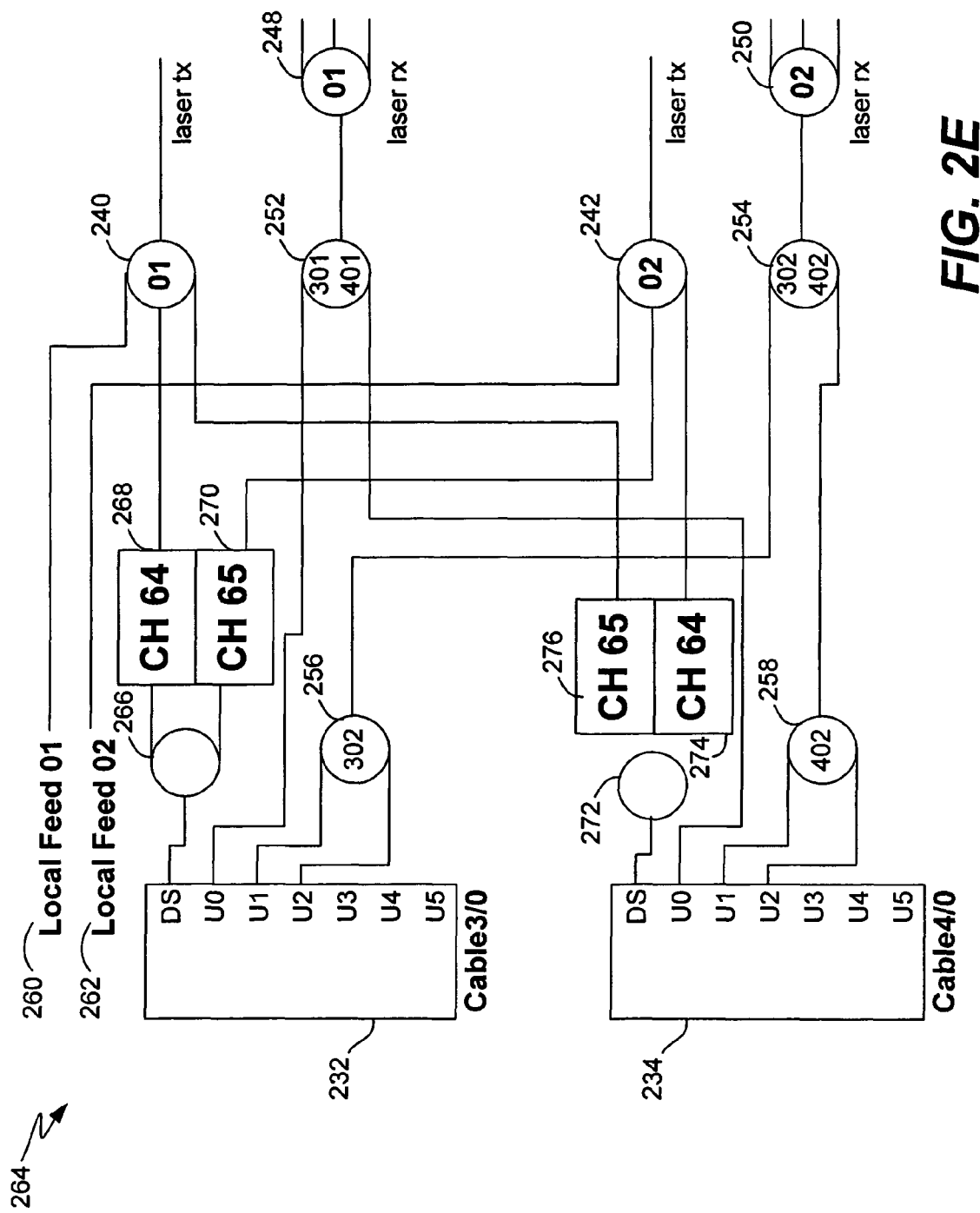
FIG. 2E is a detailed block diagram of an alternative headend topology for 1:1 redundancy in accordance with this invention.

FIGS. 2D and 2E present detailed examples of head-end topologies employing a 1:1 service. The invention is by no means limited to these topologies. As shown in FIG. 2D, the cable network head-end 230 includes a first CMTS interface 232 and a second CMTS interface 234. These CMTS interfaces may be provided on a single CMTS chassis or on separate CMTSs. In this specific embodiment, each interface has one downstream port, labeled "DS," and six upstream ports labeled "U0"-"U5." Downstream signals from CMTS 232 are provided at an intermediate frequency. When the signal reaches an upconverter 236, its frequency is increased to a level associated with cable channel 64.

Signals passing downstream from upconverter 236 encounter a splitter 238 which directs them to either a first downstream fiber node 240 or a second downstream fiber node 242. During normal operation, CMTS interface 232 services only those cable modems connected through fiber node 240. Should CMTS interface 234 (which normally services fiber node 242) fail, however, CMTS 232 can take over service to the cable modems serviced via fiber node 242.

As shown, CMTS interface 234 provides intermediate frequency downstream signals to an upconverter 244. In the example shown, upconverter 244 converts the intermediate frequency signal to an RF frequency signal corresponding to cable channel 65. That downstream signal encounters a splitter 246, which allows the downstream signal to be provided to either fiber node 240, fiber node 242, or both. During normal operation, CMTS 234 services only those cable modems connected through fiber node 242.

Considering now the upstream signal, cable modems provide data on a specified upstream frequency band to fiber nodes 248 and 250. Normally, upstream data passing through fiber node 248 passes to CMTS interface 232 (via port "U0"). If the upstream path to CMTS interface 232 is disrupted for any reason (e.g., CMTS interface 232 fails), that upstream data is provided to CMTS interface 234. To this end, a splitter 252 allows data from fiber node 248 to pass through to either interface 232 or interface 234. Similarly, a splitter 254 allows upstream date from fiber node 250 to pass to either of interfaces 232 or 234.

For telephony applications, different cable modems communicating through a given fiber node may transmit at different frequency bands. Thus, different upstream ports on a CMTS interface may be configured to handle different ones of these upstream frequency bands. This embodiment is illustrated in topology 230 by the use of upstream splitters 256 and 258. Upstream data passing through fiber node 250 may be carried on one of two possible frequency bands. One of these bands is handled by port U1 on interfaces 232 and 234. The other of these frequency bands is handled by ports U2 of the interfaces.

Note that the head-end topology depicted in FIG. 2D is intended to provide full service to the cable network. Thus, a local feed 260 provides cable TV service to subscribers via fiber node 240. Similarly, a local feed 262 provides cable TV service to subscribers via fiber node 242.

FIG. 2E depicts a slightly different head-end topology (264), which accomplishes essentially the same results. In this Figure, network elements that provide identical function to those depicted in FIG. 2D are given like reference numbers. As shown, the upstream service, with associated redundancy, is identical to that depicted in topology 230 of FIG. 2D.

The downstream network topology is somewhat different, however. In this case, each interface is capable of providing downstream data at either channel 64 or channel 65 (in the specific example). As shown, CMTS interface 232 provides downstream data (on an intermediate frequency) to a splitter 266. During normal operation, splitter 266 directs all data to an upconverter 268, which puts the data on a carrier frequency corresponding to cable channel 64. This data is then provided to downstream fiber node 240, and then on to destination cable modems. If the downstream path from CMTS interface 234 should fail for any reason, interface 232 takes over responsibility for providing downstream data to those cable modems normally serviced by interface 234. It accomplishes this by providing downstream data to an upconverter to 270 (via splitter 266). Note that upconverter 270 puts the data on a carrier frequency corresponding to cable channel 65. That data is then directed to fiber node 242 and then on to the destination cable modems.

CMTS interface 234 provides a backup to interface 232, as well. As shown, downstream data passes from interface 234 to a splitter 272. During normal operation, splitter 272 directs all downstream traffic through an upconverter 274 which puts the data on a carrier corresponding to cable channel 64. This data is then provided to fiber node 242. If interface 234 should be called upon to cover for interface 232, splitter 272 will direct the appropriate traffic to an upconverter 276, which puts that data on a carrier frequency corresponding to cable channel 65. This data is then provided to downstream fiber node 240.

B. Two Stages of Cutover

Typically, the protection afforded by this invention affects normal network operation at two stages. In a first stage, the protection CMTS (or interface) is designated for a particular working CMTS (or interface). In the most trivial case, this simply involves providing instructions for directing cable modems to the protection CMTS when their working paths fail. Other procedures may include a modified registration process, in which the cable modem pre-registers with the protection CMTS. As explained, the cable modem may obtain a network level address (e.g., an IP address) that is not part of the working CMTS interface subnet (or of the protection CMTS interface subnet). Also, a network level routing protocol may be affected during this first stage to limit propagation of the host route through the working CMTS.

In a second stage, failure has occurred and cutover from the working to the protection device is required. Here the affected cable modem registers with the protection CMTS, possibly without requiring a new network level address. The protection CMTS may also then begin to advertise the new host route to the cable modem.

1. Stage 1—Establishing a Cutover Path

Typically, when a cable modem comes on line, it registers with the CMTS that will serve it. It is possible, in accordance with this invention, that a cable modem that has had its CMTS (or path to that CMTS) fail simply registers with a designated protection CMTS. Unfortunately, most cable modem registration protocols require that the CM obtain an IP address specific to its CMTS. This results because the addressing model assigns the cable modem an IP address that is part of the IP subnet of an associated interface (on the working CMTS).

If the CM must use the conventional registration process to register with its protection CMTS after a failure on its working path, then it must obtain an IP address from the protection CMTS's subnet. As part of this process, a PC or other machine behind the cable modem may have to reboot. Thus, service may be disrupted for a somewhat lengthy period of time. This may be unacceptable for some applications, where rapid cutover is required. Further, the cable modem may have had many previous connections with external nodes using its previous IP address, which external nodes are not immediately aware of the IP address change. Regardless of this issue, DNS and/or a Call Agent will have to get involved. Note that a Call Agent is used to maintain a list of client IP addresses for use in setting up IP telephony calls.

One approach to speeding up the cutover process involves using cable modem IP addresses that are not part of any particular CMTS's interface subnet. Preferably, a registering cable modem obtains its IP address from an address block that is not part of a CMTS interface IP subnet, but is typically on an IP "supernet" shared among various CMTSs. Then when a cutover is required, the cable modem need not obtain a new IP address from a different address space. Various protocols may be used to assign the CMTS-independent IP addresses. In one embodiment, a registering cable modem obtains its IP address from a Dynamic Host Configuration Protocol (DHCP) server configured to provide IP addresses from outside the address space of any CMTS interface. DHCP is described in RFC 2131, incorporated herein by reference for all purposes. Generally, in this protocol, the computer is told to ask the network—according to prescribed rules—for a temporary network address.

This procedure has the benefit of allowing a cable modems to cutover from a failed path to a protection channel with minimal overhead. As the cable modem is already registered on the protection channel, it need not obtain a new IP address and go through the attendant time-consuming registration process. Hence service disruption is minimized. The time spent out of service is greatly reduced, connections and context are not necessarily lost, the host machine need not reboot, etc. Without these benefits, applications such as cable telephony may not be realized.

Figure 3A:
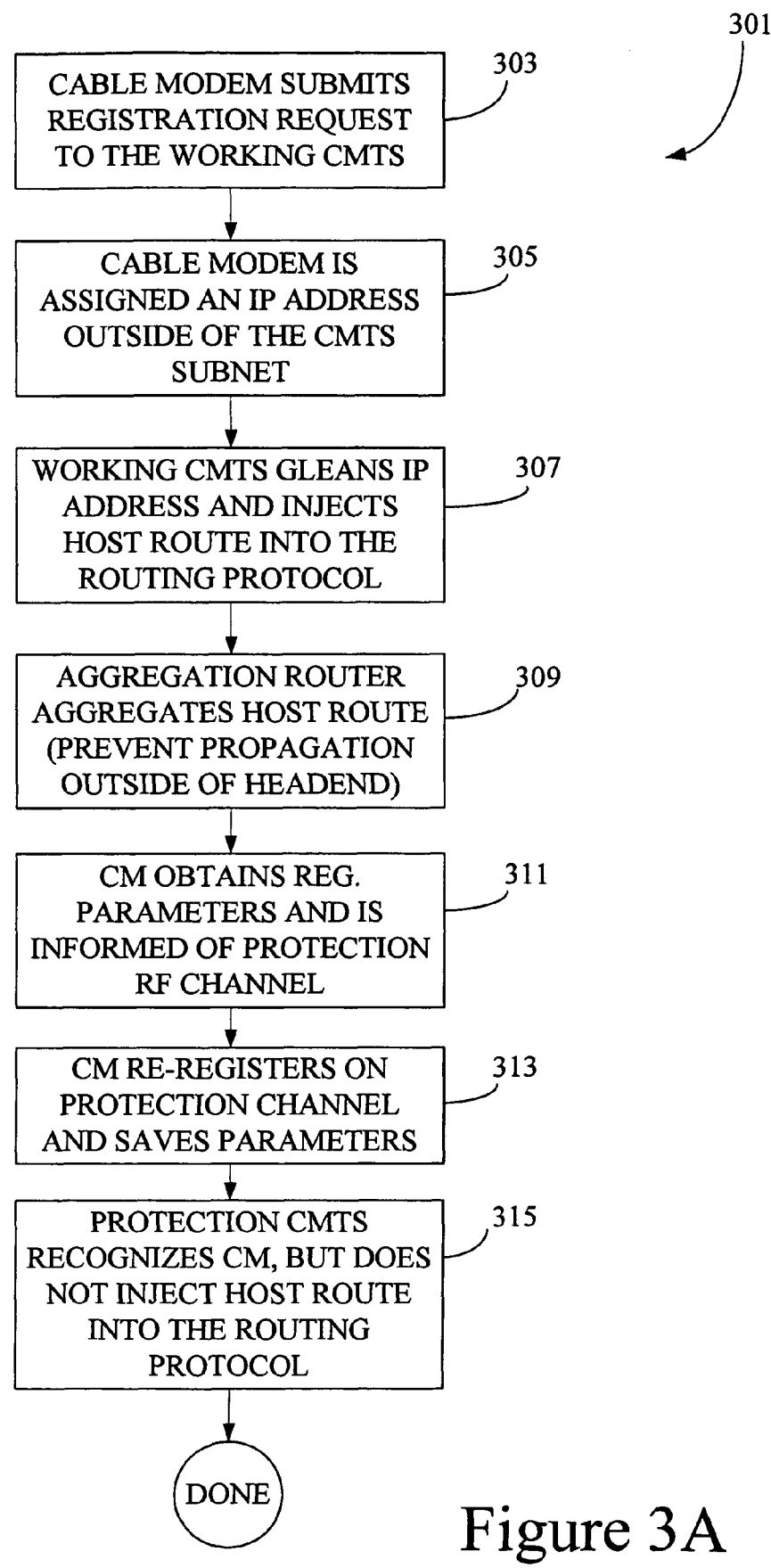
FIG. 3A is a process flow diagram depicting some operations employed within a cable network during registration of a cable modem in accordance with one embodiment of this invention.
Figure 3B:
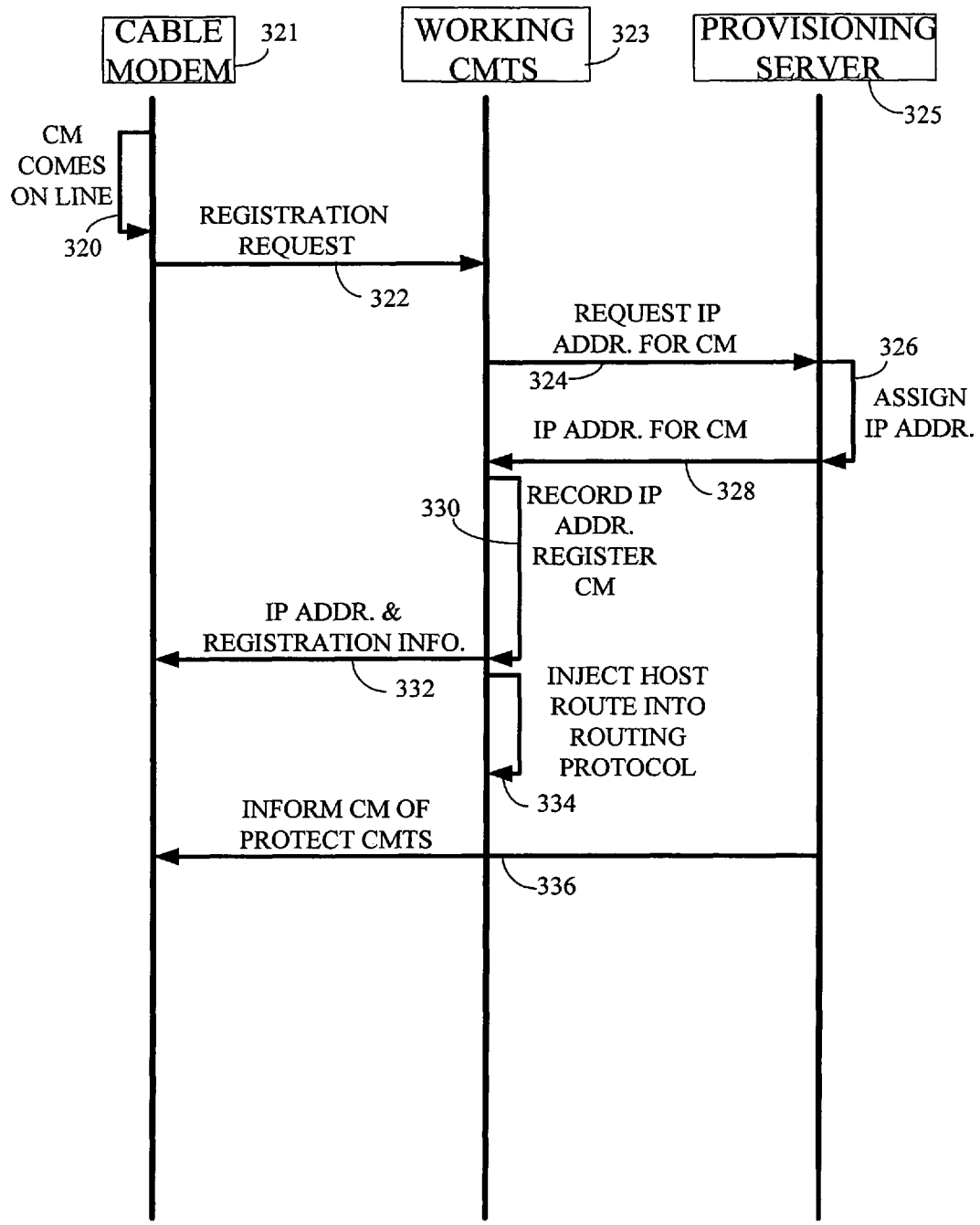
FIG. 3B is an interaction diagram depicting the interactions of a cable modem, a working CMTS, and a provisioning server during registration of the cable modem in accordance with one embodiment of this invention.
Figure 4:
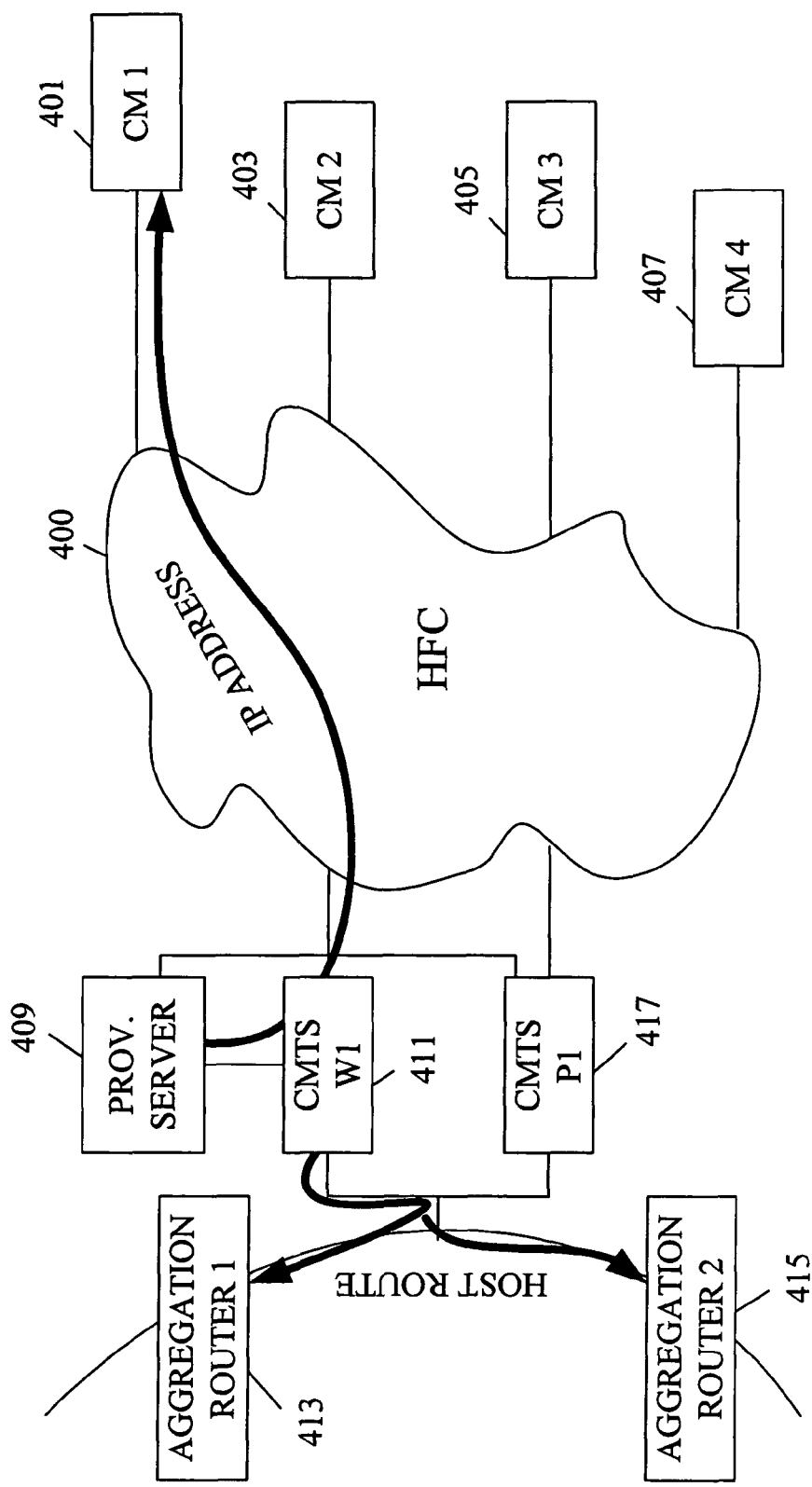
FIG. 4 is a schematic diagram of a cable network illustrating registration of a cable modem with a working CMTS in accordance with an embodiment of this invention.

FIGS. 3A, 3B, and 4 illustrate one set of procedures for registering a cable modem in accordance with an embodiment of this invention. Referring first to FIG. 3A, a flow chart is presented depicting generally the steps that a cable modem (and associated CMTSs) may go through to register on both the working CMTS a protection CMTS. As illustrated, a process 301 begins at 303 with the cable modem submitting a registration request to a working CMTS. In a specific embodiment, the registration complies with the procedures required by the DOCSIS standard. Normally, this involves obtaining an IP address for the cable modem, obtaining "ranging" parameters such as upstream frequency, power and timing, etc.

Next, at 305, the cable modem is assigned an IP address suitable for use with this invention. In this embodiment, an IP address is chosen so that that IP address can be used with both the working CMTS and the protection CMTS. Thus, the IP address should be chosen from an address block that is not dedicated to either the working CMTS or the protection CMTS. As explained above, under current practice a cable network assigns IP addresses from an address block bound to a particular CMTS interface. Unfortunately, if that interface fails (or the path to it fails) then the IP address that has been assigned to the cable modem is no longer useful. As a consequence, the cable modem must obtain a different IP address if it is to communicate through a protection CMTS. To avoid this problem, this embodiment of the present invention requires that the IP address that has been assigned to the cable modem during registration be selected from the address space lying outside the address blocks assigned to either the working CMTS or protection CMTS.

Because the working CMTS participates in the registration process, it can determine the IP address that has been assigned to the cable modem. This is illustrated at 307 where the working CMTS notes the assigned cable modem IP address and injects the associated host route into the appropriate routing protocol. The host route, in this instance, specifies the route to the registering cable modem through the working CMTS.

The host route is preferably provided to one or more aggregation routers associated with the head-end of the cable network. This is depicted at 309 in process 301. Because the host route specifies the working CMTS, and provision is made for having a protection CMTS take over for the working CMTS, the host route should not propagate beyond the head-end. Then, when the working CMTS fails and the protection CMTS takes over, the new host route can quickly replace the previous host route in the relevant routers.

Next, the cable modem obtains the relevant registration parameters, including its IP address, and is also informed of the protection RF channel. See 311. Note that the normal registration parameters include an upstream transmission frequency, an upstream transmission power, time slots for upstream transmission, etc.

Because the protection CMTS communicates via a different upstream RF channel than the working CMTS, it is necessary to inform the cable modem of the protection CMTS's upstream channel. With the contact information in hand, the cable modem re-registers on the protection channel with the protection CMTS. See 313. The cable modem will obtain the registration parameters for the protection CMTS and store them in preparation for an event that causes it to cutover. Note that this re-registration process does not assign a new IP address to the cable modem. Rather, the cable modem preserves the IP address that was assigned to it during registration on the working CMTS.

Finally, at 315, the protection CMTS recognizes the cable modem, but does not inject a host route for that cable modem into the routing protocol. If the upstream path to the working CMTS fails, and the switch over to the protection CMTS is required, the protection CMTS will rapidly accept the pre-registered cable modem. Until that time, however, the protection CMTS does not advertise its host route to the cable modem.

After pre-registration, but before cutover, the protection CMTS remains in a "protection state" ready to take over service to the cable modem when it determines that the modem's working route has failed. While in the protection state, the protection CMTS may periodically ensure that it is ready to take over service to the cable modem. This may entail that the protection CMTS determine that the protection path still works. If communication can take place over the path, the protection CMTS may request that the cable modem change certain parameters to optimize communication if a cutover becomes necessary. As indicated, the transmission characteristics of a cable network path vary with temperature, load, mechanical conditions, etc. Thus, what were optimal transmission settings one day, may be far from optimal the next day.

If the cable network uses DOCSIS, the protection CMTS may periodically issue station maintenance opportunities to the cable modem. In response, the cable modem sends a ranging request message at a transmission power and frequency as specified by its stored parameters. The protection CMTS detects the power, frequency, and timing of the ranging request. It determines how far these parameters vary from optimal, if at all, and sends a ranging response message instruction the cable modem to change its parameters as necessary. The protection CMTS may also use a DOCSIS ping to determine whether the protection path works.

FIG. 3B presents an interaction diagram for cable network components used in a specific embodiment of the present invention. Again, this embodiment involves registration of a cable modem in a manner allowing rapid cut over to a protection CMTS if a working CMTS fails. As illustrated in FIG. 3B, the relevant components are a cable modem 321, a working CMTS 323, and a provisioning server 325.

Initially, a new cable modem comes on line at 320. It then sends a registration request (322) to working CMTS 323. As part of the registration procedure, working CMTS 323 requests an IP address for the cable modem from provisioning server 325. See arrow 324. In a preferred embodiment, provisioning server 325 is running DHCP, which allows it to assign an IP address to cable modem 321 as indicated by operation 326. Subsequently, provisioning server 325 forwards the IP address to working CMTS 323. See arrow 328.

Working CMTS 323 now has all the information it requires to complete registration of cable modem 321. As part of the registration process, it records the assigned IP address of cable modem 321. See operation 330. Working CMTS 323 then forwards the IP address and registration information to cable modem 321 as indicated by arrow 332. Concurrently, working CMTS 323 injects the host route for the cable modem into the relevant routing protocol. See operation 334.

Now that cable modem 321 is registered on the working CMTS, the cable network can begin pre-registering the cable modem on the protection CMTS. In the specific embodiment depicted in FIG. 3B, this pre-registration process begins with provisioning server 325 informing cable modem 321 of the protection CMTS. As indicated in the discussion of FIG. 3A, this may involve informing the cable modem of the radio frequency channel for the protection CMTS. Regardless of the specifics, the operation of informing the cable modem is depicted by arrow 336 in FIG. 3B. After it has been informed in this manner, cable modem 321 initiates the registration procedure with the protection CMTS in a manner such as that described with reference to FIG. 3A.

In this example, provisioning server 325 serves various functions. It may normally be used to provide various telephony support services for VoIP. Server 325 may run on an arbitrary piece of hardware such as a Sun workstation or other Unix system, a Windows NT server and the like. In the depicted embodiment, the provisioning server implements DHCP as well as other relevant functions for the cable network. For example, it may contain a list of MAC addresses for cable modems associated with various paying customers. Associated with this list is the type of service available to each cable modem. For example, those subscribers having telephony service will be identified. When a cable modem registers, the provisioning server will recognize that it is a telephony subscriber and therefore cause it to register on both the working and protection CMTSs.

As mentioned, associated with the registration process, the cable network head-end injects the relevant host route into an appropriate routing protocol. FIG. 4 illustrates this process schematically. Normally, a CMTS advertises routes to its cable modems by identifying its interface subnet(s) via the appropriate routing protocol. In an embodiment of this invention, the CMTS advertises only a very small chunk of address space, not normally associated with its interfaces. These addresses provide host routes or small chunks of address space including IP addresses assigned to the cable modems during registration. Note that when the advertised address space is so small as to identify only a single cable modem, that "chunk" of address space, as used in a routing protocol, is referred to as a "host route."

Various routing protocols are in use. These include OSPS, RIP, and IGRP. In general, these protocols allow routers to exchange information identifying chunks of IP address space that they know about and/or are servicing. Conventionally, as part of a routing protocol, a CMTS may let its peer routers know that it handles an address space given by the subnet/ 255.255.255.0, for example. In other words, all cable modems that the CMTS handles have IP addresses falling within this address mask. Because the CMTS provides this address mask to its peers via a routing protocol, they know that if they have a packet destined for a node having IP address within the subnet, they should transmit the packet to the CMTS. In this invention, the CMTSs advertise specific host routes alone or in addition to their specific interface subnets.

As shown in FIG. 4, an HFC network 400 supports various cable modems, including cable modems 401, 403, 405 and 407. Each of these cable modems may be serviced by a separate fiber node, for example. In the network situation depicted, cable modem 401 has just registered and is obtaining its IP address from a provisioning server 409. If provisioning server 409 is employing DHCP to assign IP addresses, a working CMTS 411 will serve the DHCP relay function. By performing this function, CMTS 411 gleans the IP address that has been assigned to cable modem 401. It records this information. Of course, other procedures may be employed to assign IP addresses to cable modems coming on line. Preferably such procedure should allow for notifying working CMTS 411 of newly assigned IP addresses for its cable modems.

As shown, the head-end of the cable network includes multiple aggregation routers. These routers serve to facilitate communication between the cable network and external sources. In the specific embodiment shown in FIG. 4, there are two aggregation routers, a router 413 and a router 415. After CMTS determines the IP address of newly registered cable modem 401, it injects the host route for that cable modem into the routing protocols used by aggregation routers 413 and 415, as illustrated. This host route specifies that cable modem 401 can be reached through CMTS 411. Aggregation routers 413 and 415 are configured to limit propagation of this host route to routers within the head-end. In a preferred embodiment, the working and protection CMTSs of this invention are routing CMTSs, and therefore participate in the necessary routing procedures. One example of the hardware and software employed in such routing CMTSs is described below in connection with the description of FIG. 8A.

In the topology depicted in FIG. 4, multiple CMTSs on a cable plant connect to external networks via one or more higher-level aggregation routers (routers 413 and 415 in this example). Each CMTS on the cable network is responsible for its own group of cable modems with associated host routes and address/mask. Each of these CMTS advertises its portion of IP address space to the higher-level router(s). A higher-level router in possession of this information, then advertises to its peers via a routing protocol that it can handle packets having destination addresses falling within any of the host routes and address blocks of the underlying CMTSs.

Note that provisioning server 409 is connected to HFC network 400. In the embodiment described with reference to FIGS. 3A and 3B, provisioning server 409 informs cable modem 401 of a protection CMTS. In the embodiment depicted in FIG. 4, a CMTS 417 serves as the protection CMTS for cable modem 401. As illustrated, CMTS 417 can communicate with provisioning server 409 and thereby use its services.

In the above-described embodiments, some technique is required for notifying the protection CMTS of the cable modem's IP address. There are at least three preferred approaches to informing the protection CMTS. The first requires that the cable modem notify the protection CMTS of the IP address that it has obtained during an initial registration through the working CMTS. This notification may serve as a part of the DOCSIS registration process with the working CMTS. In this embodiment, the cable modem may or may not complete a complete registration (ranging and the like) with the protection CMTS. Regardless of the level of pre-registration, the protection CMTS can automatically advertise the host route to the cable modem, should the working path fail.

In a second approach, the cable modem separately registers through the protection CMTS (before or after it registers through the working CMTS) and obtains an IP address during registration. This IP address is identical to the IP address that the cable modem obtains via the working CMTS. Because the protection CMTS participates in the registration process, it records the cable modem's IP address. If DHCP is used, then the DHCP server will recognize that the cable modem requesting an IP address has already obtained such address and will merely assign the same address during the second registration. A third approach requires that the working CMTS communicate the cable modem's IP address to the protection CMTS. This may be accomplished via a special protocol for communication between the working and protection CMTSs.

2. Stage 2—The Cutover Process

Figure 5:
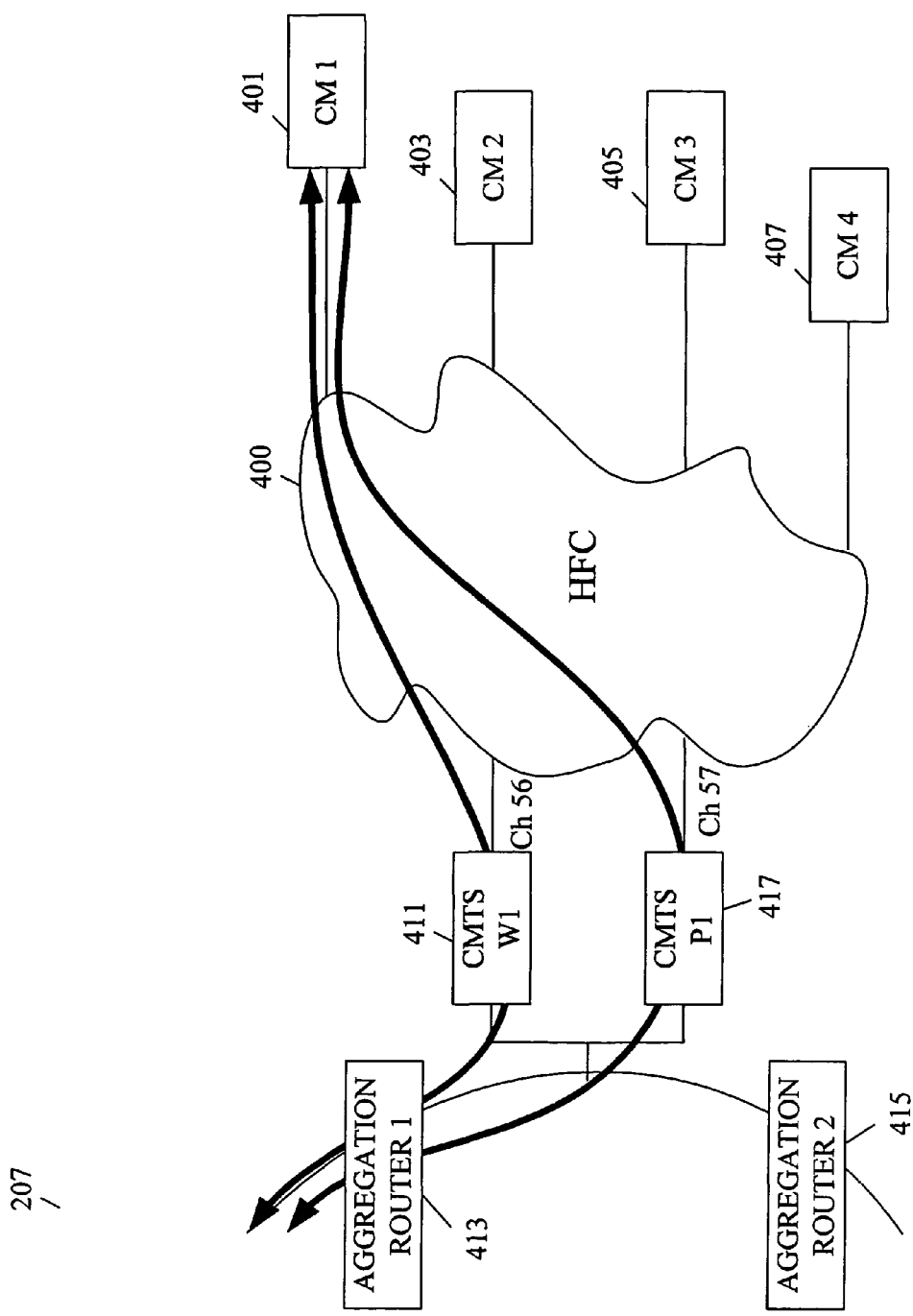
FIG. 5 illustrates a cutover procedure resulting from a failure on the path between the cable modem and the working CMTS.

FIG. 5 schematically presents the working and protection paths that cable modem 401 may employ. As shown, cable modem 401 normally communicates through CMTS 411 using downstream channel 56. Communications to and from external networks are routed through aggregation router 413. A redundant router 415 is provided to backup router 413 should it fail.

If CMTS 411 fails (or some component on the path from CMTS 411 fails), cable modem 401 reconnects through protection CMTS 417. Note that in this Figure, downstream communication from CMTS 417 is conducted over channel 57. After CMTS 401 reconnects to the protection CMTS, traffic is routed through that CMTS and aggregation router 413.

One event that must occur during the cutover is notification, via the appropriate routing protocol(s), that a new working CMTS (the protection CMTS) now provides access to the cable modems previously handled by a failed CMTS. In the embodiment of FIG. 5, part of the cutover process requires that protection CMTS 417 inject its host route to cable modem 401 into the appropriate routing protocol. Preferably, this is a conventional process such as described above with reference to the working CMTS.

Figure 6:
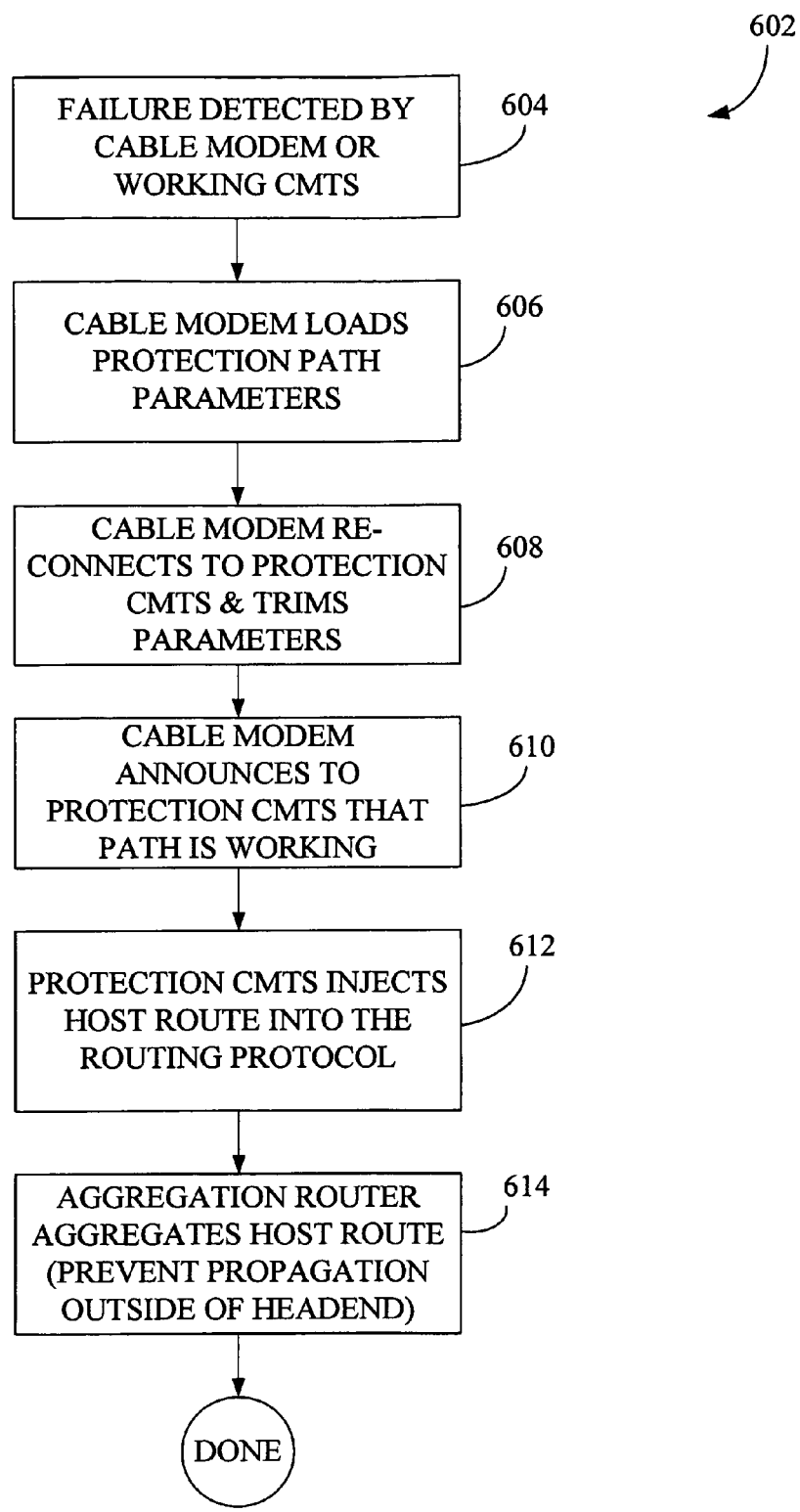
FIG. 6 is a process flow diagram depicting some operations performed on a cable network during cutover in accordance with an embodiment of this invention.

FIG. 6 presents a process flow diagram illustrating fault recovery steps in accordance with a specific embodiment of this invention. As shown, a process 602 beings at 604 with either the cable modem or the working CMTS detecting a failure. Various mechanisms for detecting such failures will be discussed below.

After failure detection, the cable modem loads, at 606, its previously stored protection path parameters. These include, for example, the upstream and downstream frequency bands for communicating with the protection CMTS, the appropriate cable modem transmission power to the protection CMTS, the communications time slots allotted for the protection CMTS, etc. Then, at 608, the cable modem connects to the protection CMTS and trims its parameters. Note that signal transmission properties vary nearly continually within a cable network. As a consequence, the parameters obtained during the pre-registration stage may no longer be optimal for communication with the protection CMTS. Trimming simply refers to the process of reoptimizing the transmission frequency, power, timing, etc. in light of current network conditions. In accordance with the DOCSIS protocol, trimming may be accomplished by the "ranging" process.

After the cable modem confirms that the protection CMTS path is working (via ranging, for example), it announces to the protection CMTS that the path is in fact working. See block 610. This announcement may take various forms; e.g., a maintenance ranging request. Thereafter, at 612, the protection CMTS injects its host route into the routing protocol. If the working CMTS has not already stopped injecting its host route into the routing protocol, it now stops. The receiving aggregation router (or routers) aggregates the new host route in a manner that prevents propagation outside of the headend. See 614. At this point, upstream packets are immediately successful, and, very soon thereafter after interior gateway protocol convergence, external packets now transit through the correct CMTS and reach the cable modem.

Figure 7:
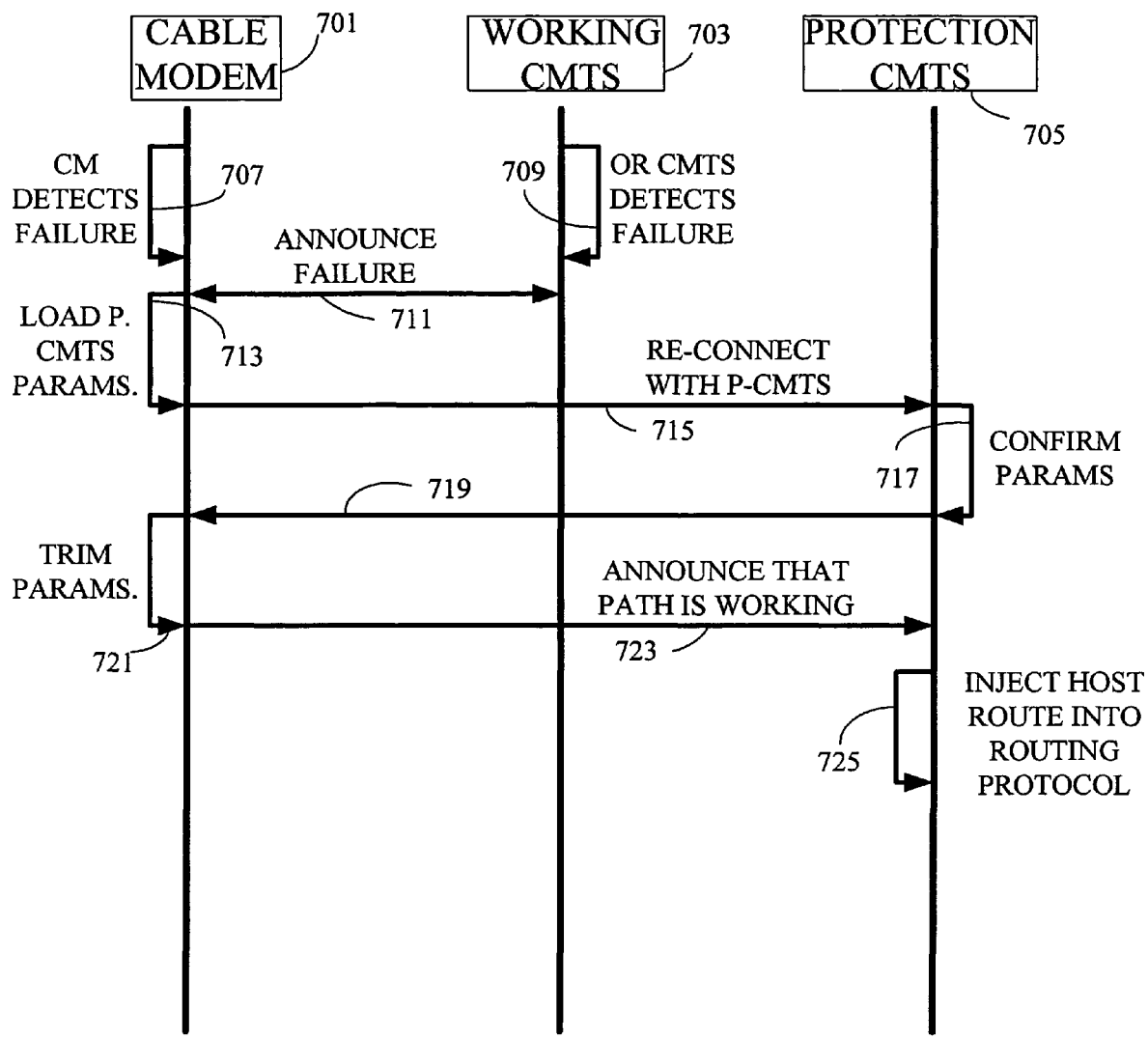
FIG. 7 is an interaction diagram depicting the interactions of a cable modem, a working CMTS, and a protection CMTS during cutover in accordance with an embodiment of this invention.

FIG. 7 provides an interaction diagram depicting the interaction of a cable modem 701, a working CMTS 703, and a protection CMTS 705 during cutover in accordance with a specific embodiment of this invention. Initially, at 707, cable modem 701 detects a failure. Alternatively, at 709, the working CMTS detects a failure. Either way, the device detecting the failure announces it to the other device. See arrow 711.

After the failure has been detected and announced, cable modem 701 loads the protection CMTS parameters as indicated by arrow 713. Using these parameters, it then attempts to reconnect with the protection CMTS 705. See arrow 715. Reconnection may involve sending a DOCSIS ranging request.

Upon receipt of the appropriate connection request from cable modem 701, protection CMTS 705 confirms that the cable modem is transmitting in a manner that allows the CMTS to service it. See arrow 717. In a DOCSIS protocol, this procedure may involve confirming that the frequency, power and timing of a ranging request are appropriate. In any event, protection CMTS 705 replies to cable modem 701 as indicated by arrow 719. Following the DOCSIS example, the reply will be a ranging response that includes any necessary changes to transmission frequency, power, and/or timing. When in receipt of this information, cable modem 701 can trim its parameters as appropriate. See 721. Next, cable modem 701 announces that it is working as indicated by arrow 723. At this point, the protection CMTS injects the new host route into the routing protocol as indicated at 725.

As emphasized herein, the systems and methods of this invention may provide fail over protection when there is a detected failure. Such failure may be an equipment failure (e.g., all operations of a CMTS cease), a circuit failure (e.g., on line card serving a subsection of the cable network fails), extreme noise (significant noise occurs over a wide frequency band and/or for an extended period of time), etc. The following examples illustrate the range of possible failures. In one case, a downstream circuit on a line card fails but upstream circuit continues to function. Even though the upstream route still functions, it may be most efficient to have the protection CMTS take over both upstream and downstream service. In another example, a fiber node residing between a working CMTS and its cable modems fails. While the working CMTS is still operational, the path to it is not. In this case, the correction would require that upstream and downstream data bypass the inoperative fiber node. This likely means that the working CMTS can not be used until the fiber node is repaired or replaced. A protection CMTS is then employed.

In normal operation (according to a standard such as DOCSIS), there should be continual "chit chat" between the CMTS and its modems. These messages are often sent at the link or MAC level. In DOCSIS, the messages take the form of pings and/or ranging requests. These messages, which are sent at least about every 30 seconds, confirm that the upstream and downstream paths between cable modem and CMTS are operational. If the CMTS should go down or some part of the path between it and the cable should become inoperational, then the cable modem will recognize that it can no longer communicate. At that point, it may begin the cutover procedure. In another scenario, the downstream path is operational, the cable modem is operational, and the CMTS is operational. The upstream path, however, is inoperational. The CMTS will recognize that it is not receiving messages from the cable modem. It may then infer that the upstream path has a problem and initiate the cutover to its protection CMTS. These examples illustrate that either the head end or the cable modems can initiate the cutover from a working to a protection path. This capability provides high system reliability.

C. CMTS Configurations

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the methods of the present invention are implemented in software such as an operating system or in an application running on an operating system.

A software or software/hardware hybrid system of this invention is preferably implemented on a general-purpose programmable machine selectively activated or reconfigured by a computer program stored in memory. Such programmable machine may be a network device designed to handle network traffic. Such network devices typically have multiple network interfaces. One important class of device that may be used to implement the present invention is the cable modem termination system. Preferably, the CMTS is a "routing" CMTS, which handles at least some routing functions. Alternatively, the CMTS may be a "bridging" CMTS, which handles only lower-level tasks.

Figure 8A:
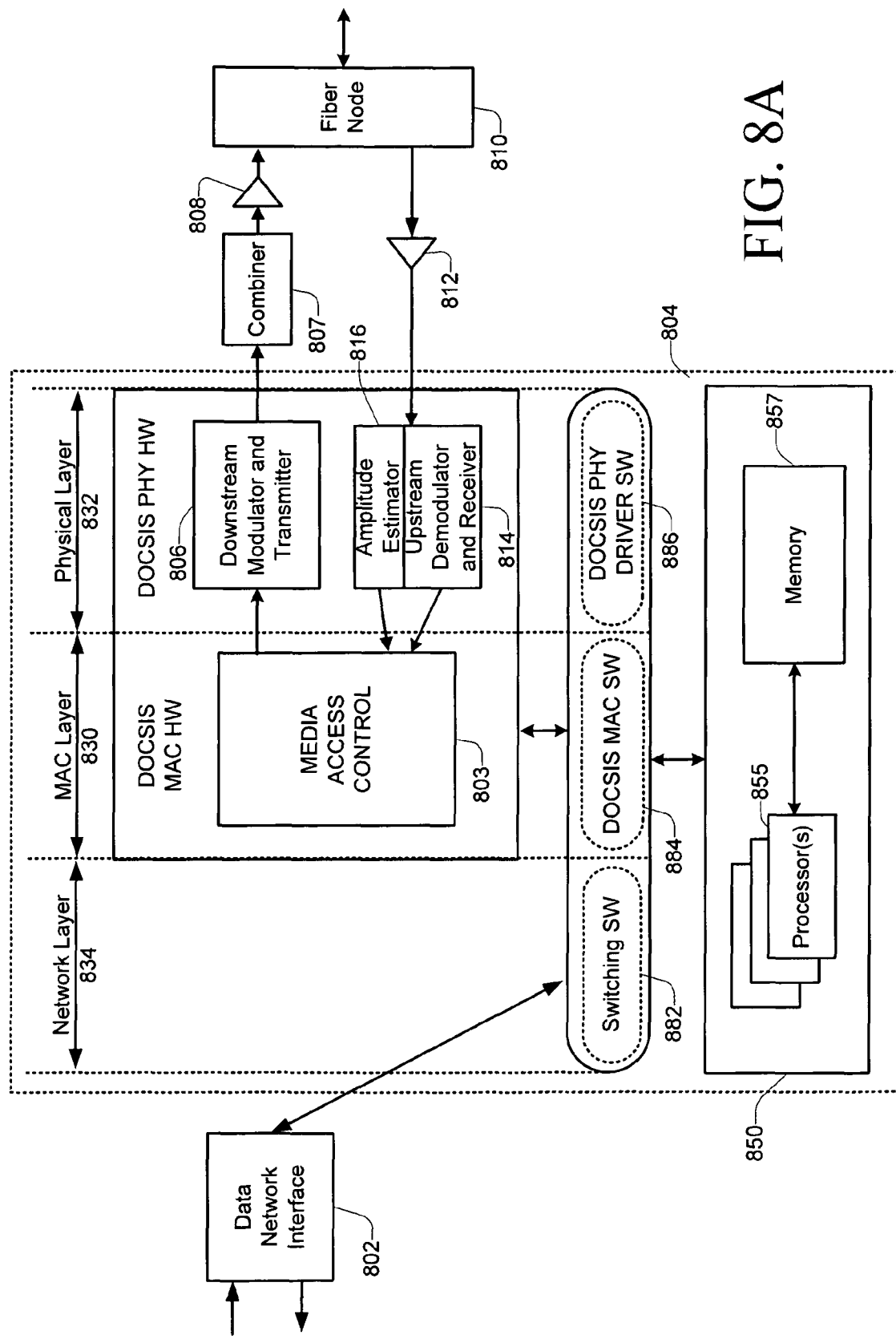
FIG. 8A is a block diagram depicting a CMTS structure that may be employed with the present invention.

FIG. 8A provides an example of some components of a CMTS that may be used to implement certain aspects of this invention. In the specific embodiment as shown in FIG. 8A, a CMTS 804 provides functions on three network layers including a physical layer 832, a Media Access Control (MAC) layer 830, and a network layer 834. Generally, the physical layer is responsible for receiving and transmitting RF signals on the cable plant. Hardware portions of the physical layer include a downstream modulator and transmitter 806 and an upstream demodulator and receiver 814. The physical layer also includes software 886 for driving the hardware components of the physical layer.

Upstream optical data signals (packets) arriving via an optical fiber node 810 are converted to electrical signals by a receiver 812. Next, the upstream information packet (RF electrical signals) is demodulated by the demodulator/receiver 814 and then passed to MAC layer block 830. A primary purpose of MAC layer 830 is to encapsulate, with MAC headers, downstream packets and decapsulate, of MAC headers, upstream packets. In one embodiment, the encapsulation and decapsulation proceed as dictated by the above-mentioned DOCSIS standard for transmission of data or other information. Note that at the time when this document was filed, the DOCSIS standard was described in the "Data-Over-Cable Service Interface Specifications—Radio Interface Specifications" SP-RFIv1.1-I02-990731, Interim Specification Jul. 31, 1999. That document is incorporated herein by reference for all purposes. The MAC headers include addresses to specific modems or to a hub (if sent upstream) by a MAC layer block 830 in CMTS 804. Note that the cable modems also include MAC addressing components. In the cable modems, these components encapsulate upstream data with a header containing the MAC address of the hub.

MAC layer block 830 includes a MAC hardware portion 803 and a MAC software portion 884, which together serve the above-described functions. In a preferred embodiment, MAC hardware portion 803 is distinct from the router's general-purpose microprocessor and is dedicated to performing some MAC layer functions.

After MAC layer block 830 has processed the upstream information, it is then passed to network layer block 834. Network layer block 834 includes switching software 882 for causing the upstream information packet to be switched to an appropriate data network interface on data network interface 802. When a packet is received at the data network interface 802 from an external source, the switching software within network layer 834 passes the packet to MAC layer 830. MAC block 803 then transmits information via a one-way communication medium to downstream modulator and transmitter 806. Downstream modulator and transmitter 806 takes the data (or other information) in a packet structure and converts it to modulated downstream frames, such as MPEG or ATM frames, on the downstream carrier using, for example, QAM 64 modulation (other methods of modulation can be used such as CDMA (Code Division Multiple Access) OFDM (Orthogonal Frequency Division Multiplexing), FSK (FREQ Shift Keying)). The return data is likewise modulated using, for example, QAM 16 or QSPK. Data from other services (e.g. television) is added at a combiner 807. An optical converter 808 converts the modulated RF electrical signals to optical signals that can be received and transmitted via Fiber Node 810 to the cable modem hub.

Note that alternate embodiments of the CMTS (not shown) may not include network layer 834. In such embodiments, a CMTS device may include only a physical layer and a MAC layer, which are responsible for modifying a packet according to the appropriate standard for transmission of information over a cable modem network. The network layer 834 of these alternate embodiments of CMTS devices may be included, for example, as part of a conventional router for a packet-switched network. In a specific embodiment, the network layer of the CMTS is configured as a cable line card coupled to a standard router that includes the physical layer block 832 and MAC layer block 830. Using this type of configuration, the CMTS is able to send and/or receive IP packets to and from the data network interface 802 using switching software block 882.

The data network interface 802 is an interface component between external data sources and the cable system. The external data sources transmit data to the data network interface 802 via, for example, optical fiber, microwave link, satellite link, or through various media. The data network interface includes hardware and software for interfacing to various networks such as, for example, Ethernet, ATM, frame relay, etc.

As shown in FIG. 8A, CMTS 804 includes a central hardware block 850 including one or more processors 855 and memory 857. These hardware components interact with software and other hardware portions of the various layers within the CMTS. They provide general purpose computing power for much of the software. Memory 857 may include, for example, I/O memory (e.g. buffers), program memory, shared memory, etc. Hardware block 850 may physically reside with the other CMTS components. In one embodiment, the software entities 882, 884, and 886 are implemented as part of a network operating system running on hardware 850.

Preferably, the protective registration and cutover functions of this invention are implemented in software as part of the operating system. In FIG. 8A, such software may be part of MAC layer software 884 and/or the switching software 882, or may be closely associated therewith. Of course, the registration and cutover logic could reside in hardware, software, or some combination of the two.

The procedures employed by the working and protection CMTSs during registration and pre-registration are preferably performed at the MAC layer of the CMTS logic. Thus, in CMTS 804, most of the registration operations would be performed by the hardware and software provided for MAC layer logic 830. Associated with the registration are adjustments to the cable modem's transmission power and transmission frequency. To allow MAC layer logic 830 to implement such adjustments, it may use power readings (and sometimes frequency and signal to noise ratio readings) from an amplitude estimator 816 forming part of the physical layer logic 832.

The operations associated with obtaining an IP address for cable modems are preferably implemented at the network layer lever 834. As noted, this may involve the CMTS communicating with a DHCP server via data network interface 802, for example. In addition, network layer logic 834 is typically responsible for the operations required to inject host routes into the appropriate routing protocols.

Figure 8B:
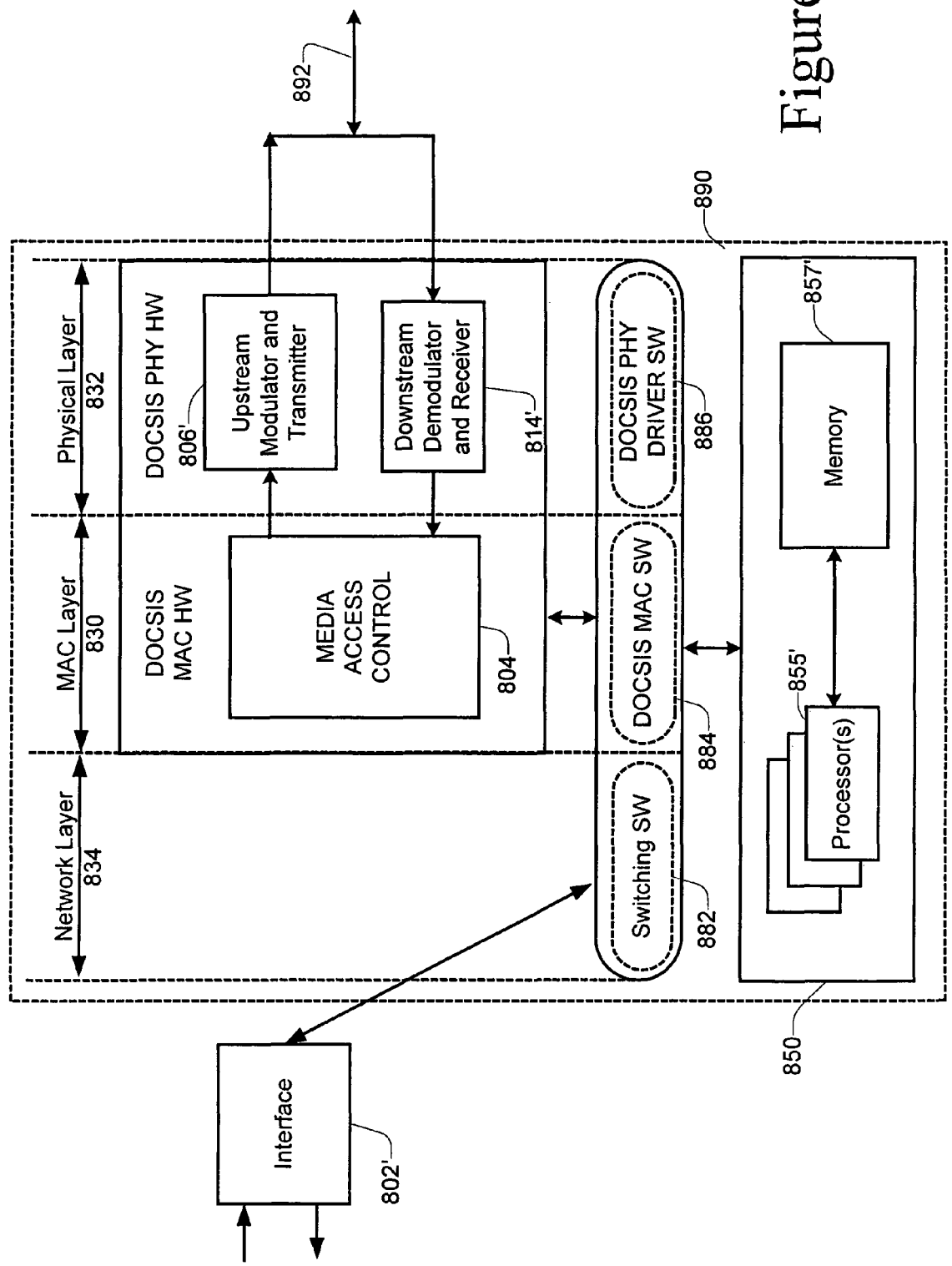
FIG. 8B is a block diagram depicting a cable modem structure that may be employed with the present invention.

FIG. 8B presents a block diagram of a cable modem 890 suitable for use with this invention. As shown, modem 890 contains many logic blocks, hardware elements, and software elements similar to those of CMTS 804. A memory 857' should be able to store registration parameters from both working and protection CMTSs. Note that rather than keeping track of information for all cable modems serviced by a CMTS interface, modem 890 need only keep track of its own parameter (e.g., power, frequency, time slots . . . ). Thus, the memory 857' and processors 855' need not have the storage and processing capacities of their counterparts in CMTS 804.

As shown, interface 802' connects to a PC or other node associated with the cable modem. At the other end of modem 890, a module 806' modulates and transmits upstream data and a module 814' demodulates and receives downstream data. The roles of these blocks are reversed at the CMTS, which sits at the other end of the cable network. Further, the downstream and upstream lines combine directly to a coaxial cable 892.

The redundancy methods of this present invention may be implemented on various general purpose cable modem termination systems. In a specific embodiment, the systems of this invention may be specially configured CMTSs such as, for example, specially configured models in the uBR-7200 series of CMTSs available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Although the system shown in FIG. 8A represents one specific CMTS architecture of the present invention, it is by no means the only CMTS architecture on which the present invention can be implemented. For example, other types of interfaces and media could also be used with the CMTS.

Regardless of network device's configuration (for cable plants or otherwise), it may employ one or more memories or memory modules (e.g., memory 857) configured to store program instructions for the network operations and other functions of the present invention described herein. The program instructions may specify an operating system and one or more applications, for example. Such memory or memories may also be configured to store data structures or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Presented below is a very specific methodology and message format to handle redundant CMTSs and a CMTS-cable modem (CM) protocol for quick ranging to the backup CMTS and quick cutover when needed. Many of the terms and procedures presented here are described in detail in the DOCSIS standard, version 1.1, previously incorporated by reference.

Media Access Control Specification
MAC Management Messages
Downstream Channel Change Request (DCC-REQ)

A DCC-REQ may be transmitted by a CMTS to a CM to switch to the downstream channel that the CM is using. The format of a DCC-REQ may be as shown in Figure below:

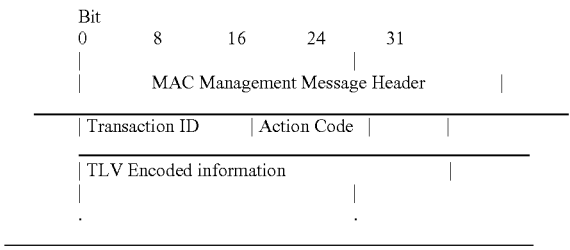

Transaction ID Unique identifier for this transaction assigned by the CMTS
Action Code The appropriate Action Code; the CM may behave as follows
0 = Switch to the Protect downstream channel do initialization
1 = Switch to the Protect downstream channel do occasional ranging
2 = Switch to the Protect downstream channel after failure
3 = Switch to the Working downstream channel
All other parameters are coded as TLV tuples.

When the Action Code is 0, 1, or 2, the DCC-REQ message may contain the following TLVs. When Action Code is 3, the DCC-REQ message must contain the following TLVs.

Downstream Frequency The downstream frequency which the CM is to switch to.

Priority The priority of this backup channel

If the downstream frequency is not explicitly stated with the downstream frequency TLV, then the CM must choose a downstream frequency based upon the list of downsteam frequencies and their priorities that were provided during configuration. If the list does not exist, or the frequencies are not working, the CM must begin searching for a new downsteam.

When the Action Code is 0, 1, or 3, if the CMTS does not get a DCC-RSP after T9 timeout, it must retry.

The CMTS should provide each CM an Occasional Ranging opportunity with the Protect CMTS at least once every 24 hour period.

Downstream Channel Change Response (DCC-RSP)

An DCC-RSP must be transmitted by a CM to a CMTS in response to receiving a DCC-REQ if the DCC-REQ Action Code is a 0, 1, or 3. If DCC-REQ Action Code was a 0 or a 1, the CM must send a DCC-RSP after it has returned back from the Protect CMTS. If the DCC-REQ Action Code was a 3, the CM must send a DCC-RSP before it returns to the Working CMTS. If the DCC-REQ Action Code was a 2, the CM must not send a DCC-RSP.

The format of a DCC-RSP message may be as shown in Figure below:

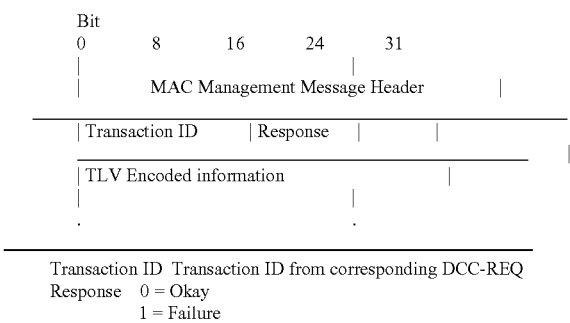

```
Bit
0       8       16      24      31
|                               |
|       MAC Management Message Header     |

| Transaction ID    | Response  |       |

| TLV Encoded information       |       |
|                               |
.                       .
```

Transaction ID  Transaction ID from corresponding DCC-REQ
Response    0 = Okay
            1 = Failure The DCC-RSP message may contain:

Downstream Frequency The downstream frequency which the CM is to switch to.

Priority The priority of this backup channel

Cable Modem—CMTS Interaction

Cable Modem Initialization

For Working CMTS, following the standard procedure and:

Transfer Operational Parameters

The CM's config. file may contain the Backup Downstream Channel Set TLV. If present, the CM must send them in the Registration Request.

After the CM initializes with the Working CMTS, the Working CMTS should send a DCC-REQ with an Action Code of 0 to allow the CM to initialize with the Protect CMTS. When the CM registers with the Protect CMTS, it follows the standard procedure with the exception of skipping:

Establish IP Connecivity

Establish Time of Day

Transfer Operational Parameters

Several TLVs have been added in REG-REQ and REG-RSP.

Registration

Registration Request must contain the following TLVs:

Modem Primary SID for Protect CMTS with Initialization SID 0;

Modem IP Address for Protect CMTS with the CM's current IP address;

The Registration Response must contain the following TLVs:

Modem Primary SID for Protect CMTS with the assigned primary SID if provided now or Initialization SID 0 if provided later during failure-over.

Modem IP Address for Protect CMTS with the same IP address if it can support or Initialization IP address of 0.0.0.0 if CM must invoke DHCP mechanisms to obtain an IP address later when failure.

Modem Occasional Ranging SID for Protect CMTS. The Protect CMTS must allocate a contention ranging opportunity with a region large enough to account for the variation in delays between any two CMs.

Modem Failure Ranging SID for Protect CMTS. The Protect CMTS must allocate a contention ranging opportunity with region large enough to account for the variation in delays between any two CMs.

Baseline Privacy Initialization

If the CM is provisioned to run Baseline Privacy, the CM must skip it now, and initialize Baseline Privacy operations later during failure switch.

Standard Operation

Changing Downstream Channels

The Working CMTS must provide each CM an Occasional Ranging opportunity with the Protect CMTS at least once every 24 hour period by sending a DCC-REQ with an Action Code equal to 1. If the CMTS does not get DCC-RSP after T9 timeout, it must retry.

When a CM performs Occasional Ranging with the Protect CMTS, the CM must send the RNG-REQ message using the Occasional Ranging SID. If the Occasional Ranging SID is equal to the Initialization SID 0, than the CM must use the ranging backoff parameter in the current MAP. The Protect CMTS must allocate a contention ranging opportunity with a region large enough to account for the variation in delays between any two CM. The CM must finish Occasional Ranging within T9 timeout.

The CM may accumulate the adjustment of the ranging parameters with the Working CMTS, and apply it to the ranging parameters for the Protect CMTS to better estimate the CM's initial ranging parameters when switching to the Protect CMTS.

Changing Upstream Burst Parameters

Never change for Protect CMTS

Changing Upstream Channels

Never change for Protect CMTS

Failure Switch Mode

When a CM receives a DCC-REQ with Action Code 2 or when a CM detects downstream failure, the CM will Failure Switch using the following steps:

step1: CM switches downstream channels and synchronize with the Protect downstream channel.

step2: For Failure Ranging, the CM must send the RNG-REQ using the Failure Ranging SID. The Protect CMTS must send the RNG-RSP message with the Ranging Status="success" and with the a Primary SID for use with the Protect CMTS.

step3: If the CM IP Address for Protect CMTS is the Initialization IP address of 0.0.0.0, then the CM must invoke DHCP mechanisms to obtain an IP address.

step4: If the CM is provisioned to run Baseline Privacy, the CM must initialize Baseline Privacy operations.

The Protect CMTS must allocate contention ranging opportunities with a region large enough to account for the variation in delays between any two CMs.

Parameters and Constants

System Name Time Reference Minimum Value Default Value Maximum Value

CMTS T9 Wait for DCC-RSP 5

CMTS DCC-REQ Retries Number of Retries on DCC-REQ 3

Common Radio Frequency Interface Encodings

Backup Downstream Channel Set: This field defines the parameters associated with Backup Downstream Channels Type Length Value: 29 n Priority: The priority of this backup channel Type Length Value: 29.1 10-7

More than one backup downstream channel may have the same priority. In this case, the CM must scan for these channels from lowest to highest frequency.

Downstream Frequency The receive frequency to be used by the CM. This is the center frequency of the downstream channel in Hz stored as a 32-bit binary number. Downstream Frequency is the unique index of the Backup Downstream Channel Set.

Type Length Value: 29.2 4 Rx Frequency

Valid Range The receive frequency must be a multiple of 62599 Hz

Downstream In-Active Timer: Timer in msec that the CM uses to detect downstream failure before it switchs to the Protect CMTS. This timer should be a level timer based on the highest QoS the CM has.

Type Length Value: 29.4 4 Downstream in-active timer

Modem Primary SID for Protect CMTS: This is a 16-bit field of which the lower 14 bits define the SID with bits 14 and 15 defined to be 0. During initialization with Protect CMTS, the CM must send REG-REQ message containing this TLV with an Initialization SID 0. Protect CMTS must send REG-RSP message containing this TLV with an assigned Primary SID if provided now or Initialization SID of 0 if provided later when a failure occurs. During failure switchover, the Protect CMTS must send RNG-RSP message with Ranging Status="success", containing this TLV with the assigned primary SID.

Type Length Value: 29.5 2 SID

Modem IP Address for Protect CMTS: The IP address of the CM when it is in normal operation with the Protect CMTS. During initialization with the Protect CMTS, the CM must send REG-REQ message containing this TLV with its current IP address. The Protect CMTS must send a REG-RSP message containing this TLV with the same IP address if it can support the address, or the Initialization IP address of 0.0.0.0 if it cannot. If the CM receives 0.0.0.0, the CM must invoke DHCP mechanisms to obtain an IP address when it performs registration on the Protect CMTS.

Type Length Value: 29.6 4 IP Address

Modem Occasional Ranging SID for Protect CMTS: SID is a 16-bit field of which the lower 14 bits define the SID with bits 14, 15 defined to be 0. During initialization with Protect CMTS, Protect CMTS must send REG-RSP message contains this TLV. When CM do Occasional Ranging with Protect CMTS, CM must send the RNG-REQ use this Occasional Ranging SID, if Occasional Ranging SID is Initialization SID 0, than use the ranging backoff in the current MAP. Protect CMTS must allocate contention ranging opportunity with region large enough to account for the variation in delays between any two CMs, CM must finish Occasional Ranging within T9 timeout.

Type Length Value: 29.7 4 SID,
Occasional Ranging backoff start,
Occasional Ranging backoff end Modem Failure Ranging SID for Protect CMTS: The SID is a 16-bit field of which the lower 14 bits define the SID with bits 14 and 15 defined to be 0. During the initialization with Protect CMTS, the Protect CMTS must send a REG-RSP message containing this TLV. During failure switch-over, when the CM does Failure Ranging with the Protect CMTS, the CM must send the RNG-REQ using this Failure Ranging SID. The Protect CMTS must send a RNG-RSP with Ranging Status="success" message and containing the Modem Primary SID for Protect CMTS TLV with the assigned Primary SID. The Protect CMTS must allocate a contention ranging opportunity with a region large enough to account for the variation in delays between any two CMs.

Type Length Value: 29.8 4 HD,
Failure Ranging backoff start,
Failure Ranging backoff end

CMTS Redundancy

Overview

DOCSIS systems which are intended to be used for high availability applications such as voice or mission critical data need to be able to offer rundancy in equipment in order to protect from either CMTS failure of HFC plant failure. The general approach that DOCSIS follows is to provide the CM access to two (or more) CMTS domains, and let the CM switch-over from the first CMTS, known as the Working CMTS, to the second CMTS, known as the Protect CMTS, when the CM determines there is a failure with the Working CMTS.

The issues addressed include:

What is the criteria for the CM to switch from the Working CMTS to Protect CMTS?

What is the criteria for the CM to switch from the Protect CMTS to Working CMTS?

Allowing the Working and Protect CMTS to support traffic at the same time.

Allowing the CM to be moved between CMTS domains for the purposes of load sharing.

Ranging on the Protect CMTS.

Management of Service Flows, SIDs, IP Addresses, and Baseline Privacy between the two CMTSs.

In order to quickly switch the CM to from the Working CMTS to the Protect CMTS, the CM needs to pre-initialization and perform occasional ranging with the Protect CMTS. The operation of the CM with the Protect CMTS can be classified as four states:

Pre-Initialization: The CM will partially initialize with the Protect CMTS.

Occasional Ranging The CM will perform occasional ranging with the Protect CMTS

Failure Switch: The CM will perform final initialization with the Protect CMTS during failure Normal Operation: Standard operation For Pre-Initialization, the challenges are:

CM may not get a primary SID assigned;

CM's current IP address may not be supported by the Protect CMTS;

CM must not initialize Baseline Privacy operations if the CM is provisioned to run Baseline Privacy.

The solution is for the CM to perform final initialization with Protect CMTS during failure.

For Occasional Ranging, the challenges are:

CM may not get a primary SID assigned;

each ranging opportunity must be quick enough;

each region must be large enough to account for variation in delays between any two CMs.

The solution is to allocate a quick contention ranging opportunity to Modem Occasional Ranging SID for Protect CMTS. This is similar in concept to the Initial Maintenance IE.

For Failure Switch, the challenges are:

CM must first does Failure Ranging which has the same problems as Occasional Ranging, than final initial with Protect CMTS.

The solution is to allocate a much more quicker contention ranging opportunity to Modem Failure Ranging SID for Protect CMTS. This is similar in concept to the Initial Maintenance IE. The CM gets a Primary SID assigned in RNG-RSP with Ranging Status=success message. The CM must invoke DHCP mechanisms to obtain an IP address and must initialize Baseline Privacy operations if the CM is provisioned to run Baseline Privacy.

For Normal Operation, the challenge is:

Protect CMTS may not support that many CMs at normal operation.

The solution is for the Protect CMTS to send the CM back to its Working CMTS or some other Working CMTS.

D. Other Embodiments

Setting working and protection paths, as described above, has another application beyond merely providing redundancy. Typically installing new software on a cable network is very problematic, mainly because the types of bugs and how to remedy them are unknown ahead of time. Thus, there must a period of service time in which the network may experience significant problems associated with the new software's bugs. In fact, the network performance can be so poor, that the old software is reinstalled. By providing a protection path, the new software can be tested by some of the cable modems without disrupting service through the working path for most cable modems. Thus, the new software and its affects on the cable network can be characterized before it is used for actual service.

While the discussion to this point has focused on a redundancy technology for cable networks, the technology of the present invention may be applied to any shared-access network having a plurality of hosts or nodes which share at least one channel for communicating with at least one "head-end" in the network. Examples of shared-access networks include, in addition to cable networks, wireless networks, Ethernet, etc. In the cable network, the plurality of nodes represents a plurality of cable modems that communicate with at least one CMTS at the centralized termination system using at least one shared-access upstream and downstream channel.

In general, the methods and apparatus described above may be implemented on a protection device (e.g., a router) for providing redundancy in a network having (1) a working device (e.g., another router) that provides normal service to a host and (2) the protection device which takes over service to the host should service from the working device fail. Such general methods may include the following sequence: (a) pre-registering the host with the protection device before or after it registers with the working device; and (b) assuming a protection state in which the protection device can take over service of the host should its service with the working device fail. Generally, such methods (and associated apparatus) will be particularly valuable in the context of telephony service.

In the wireless system (e.g., represented by FIG. 9) the plurality of nodes or hosts corresponds to the plurality of wireless nodes 950 which use at least one shared access channel to communicate with at least one access control system 922 located at the head end of the wireless system.

Figure 9:
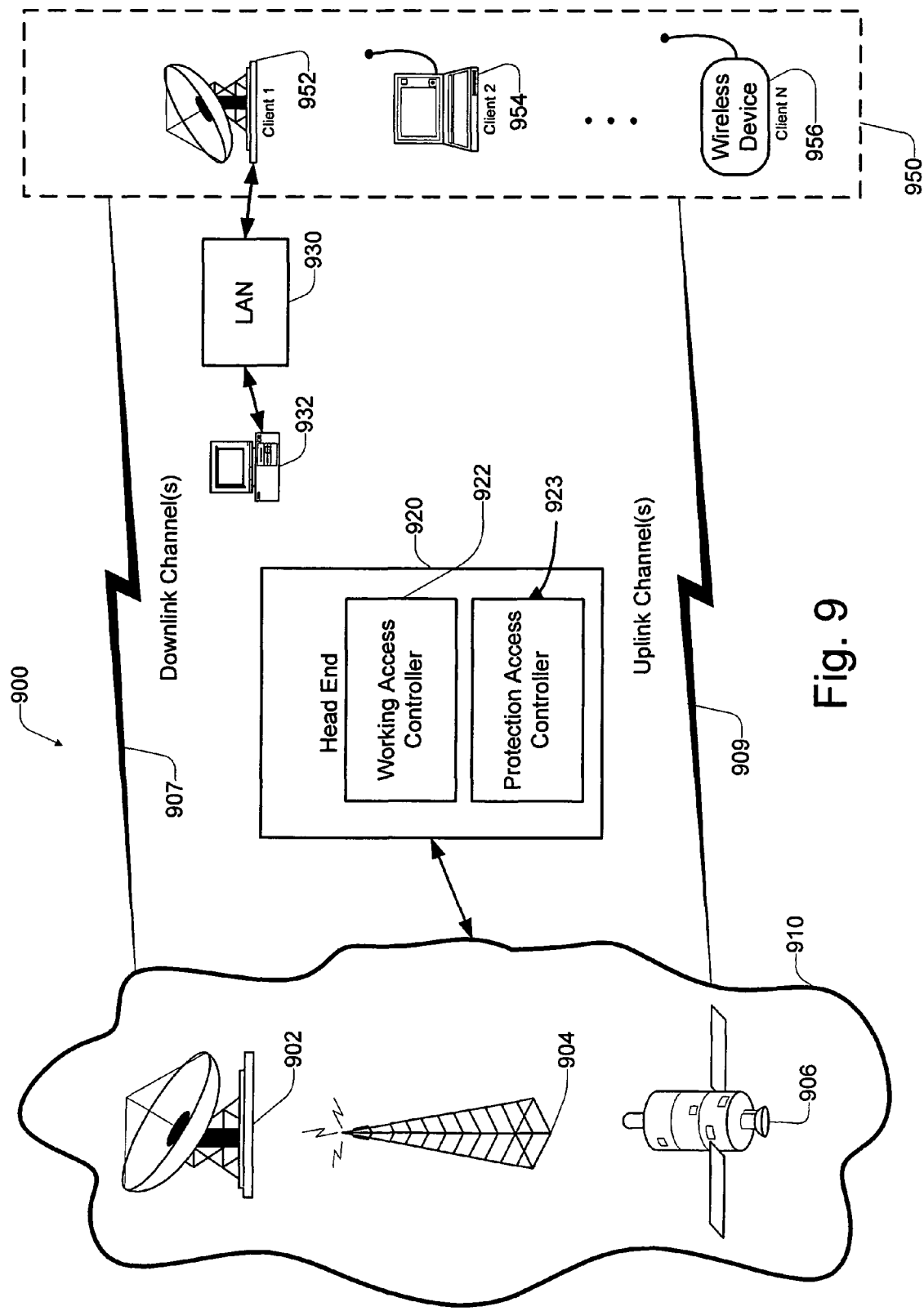
FIG. 9 is a schematic illustration of a wireless network suitable for implementing the present invention.

As shown in FIG. 9, the wireless system includes a central termination system (or head end) 920. The head end includes a working access controller or access control system (ACS) 922 which communicates with a plurality of wireless nodes 950, and coordinates access between each of the wireless nodes and the head end 920. The access controller 922 may include memory and at least one processor. In a specific embodiment, the function of the access controller 922 is analogous to that of the CMTS described above with respect to cable modem networks. It may serve as a router as well.

The head end 920 communicates with a plurality of wireless nodes 950 via any one of a plurality of wireless transmitting and receiving devices 910. As shown in FIG. 9, for example, the plurality of wireless transmitting and receiving devices 910 may include satellite base stations 902, orbital satellites 906, radio towers 904, etc.

In a specific embodiment which is analogous to that of cable modem networks, the head end 920 of the wireless computer system communicates with the plurality of nodes 950 via one or more downlink channels 907 and one or more uplink channels 909. Each downlink channel 907 is a broadcast-type channel utilized by the head end to communicate with an associated group of wireless nodes within the wireless network. The uplink channel 909 is a shared-access channel, which is utilized by a group of wireless nodes (analogous to cable modems) to communicate with the head end 920.

The working access controller 922 stores registration parameters for the various nodes that it services. The access controller 922 may also store the IP addresses for nodes that it services while being backed up by a protection access controller 923. These IP addresses are also stored by protection access controller 922 to allow a smooth transition in service should working access controller 922 fail.

In a specific embodiment of the present invention, the registration process and information is similar to that of the cable network CMTSs described above. Moreover, the technique of the present invention for cutover using a single IP address for both the working and protection access controllers may be implemented in wireless system 900.

The wireless devices or nodes 950 may include any one of a number of wireless transmitting/receiving devices. For example, a satellite dish 952 may be used to communicate with the head end 920 via the uplink and downlink channels. The satellite dish may, in turn, be connected to a local area network (LAN) 930 which, may be further connected to one or more computer systems 932. Another wireless device may be a portable/wireless computer system 954, which is able to transmit and receive information to the head end via uplink and downlink channels 907 and 909. Other wireless devices 956 may include, for example, wireless telephones, handheld computing devices, etc.

In specific embodiments where the uplink and downlink channels within the wireless system 900 are utilized in a manner similar to that of the upstream and downstream channels of a cable modem network, the above-described redundancy methods may easily be implemented in wireless system 900 using the detailed description of the present invention provided herein. Moreover, the technique of the present invention may be easily implemented in any computer network which uses shared access channels for communicating between a centralized computing system and one or more remote nodes.

Although the foregoing invention has been described in some detail for purposes of clarity of understanding, it will be apparent that certain changes and modifications may be practiced within the scope of the appended claims. For example, while ranging was described above, other techniques for causing modems to transmit signals at predefined frequencies and amplitudes may be employed.

What is claimed is:

1. A method implemented on a working CMTS for providing redundancy to a cable network in which the working CMTS provides normal service to a cable modem via a first channel and a protection CMTS provides protection service, by taking over service to the cable modem should normal service from the working CMTS become unavailable, via a second channel, the method comprising:

receiving, by the working CMTS, a registration request from the cable modem;

obtaining an IP address by the working CMTS for the cable modem, the IP address being obtained from an address space outside a first subnet of IP addresses;

wherein the first subnet of IP addresses is dedicated to the working CMTS for assignment to its cable modems;

informing the cable modem of the obtained IP address;

informing the cable modem of at least one registration parameter specific to the first channel;

wherein the cable modem is informed of the second channel;

wherein the cable modem pre-registers, in response to being informed of the second channel, with the protection CMTS via the second channel;

wherein the cable modem is informed of at least one registration parameter specific to the second channel;

wherein the cable modem stores the at least one registration parameter specific to the second channel in preparation for a failover event;

wherein the cable modem loads, in response to the determining of the failure, the at least one registration parameter specific to the second channel;

wherein the cable modem connects with the protection CMTS via the second channel using the loaded at least one registration parameter specific to the second channel;

wherein the obtained IP address is used in communications with both the working CMTS and the protection CMTS;

wherein the protection CMTS takes over service to the cable modem without obtaining a new IP address for the cable modem.

2. The method of claim 1, wherein the working CMTS is a routing CMTS.

3. The method of claim 1, wherein the address space is outside a second subnet of IP addresses, the second subnet of IP addresses being dedicated to the protection CMTS for assignment to its cable modems.

4. The method of claim 1, further comprising communicating the obtained IP address for the cable modem to the protection CMTS.

5. The method of claim 1, further comprising injecting a host route to the cable modem into a routing protocol.

6. The method of claim 5, wherein injecting the host route comprises providing the host route to one or more aggregation routers servicing the cable network.

7. The method of claim 1, wherein the at least one registration parameter specific to the first channel comprises a transmission power, a transmission frequency, or transmission time slots at which the cable modem is to communicate with the working CMTS via the first channel.

8. The method of claim 1, wherein the at least one registration parameter specific to the second channel comprises a transmission power, a transmission frequency, or transmission time slots at which the cable modem is to communicate with the protection CMTS via the second channel.

9. The method of claim 1, wherein the cable modem sends a ranging request message to the protection CMTS after the determining of a failure of the working CMTS's service to the cable modem.

10. The method of claim 1, wherein obtaining an IP address by the working CMTS for the cable modem comprises:
requesting, by the working CMTS, an IP address for the cable modem from a provisioning server; and
receiving, by the working CMTS, an IP address assigned to the cable modem from the provisioning server.

11. The method of claim 10, wherein the provisioning server assigns an IP address for the cable modem using DHCP; and wherein the working CMTS performs a DHCP relay function.

12. The method of claim 1, wherein obtaining an IP address by the working CMTS for the cable modem comprises:
gleaning, by the working CMTS, an IP address assigned to the cable modem.

13. The method of claim 1, further comprising:
recording, by the working CMTS, the obtained IP address.

14. A computer program product comprising a non-transitory machine readable medium containing program instructions which, when executed by a working CMTS, perform a method for providing redundancy to a cable network in which the working CMTS provides normal service to a cable modem via a first channel and a protection CMTS provides protection service, by taking over service to the cable modem should normal service from the working CMTS become unavailable, via a second channel, the method comprising:

receiving, by the working CMTS, a registration request from the cable modem;

obtaining an IP address by the working CMTS for the cable modem, the IP address being obtained from an address space outside a first subnet of IP addresses;

wherein the first subnet of IP addresses is dedicated to the working CMTS for assignment to its cable modems;

informing the cable modem of the obtained IP address;

informing the cable modem of at least one registration parameter specific to the first channel;

wherein the cable modem is informed of the second channel;

wherein the cable modem pre-registers, in response to being informed of the second channel, with the protection CMTS via the second channel;

wherein the cable modem is informed of at least one registration parameter specific to the second channel in preparation for a failover event;

wherein the cable modem loads, in response to determination of a failure of the working CMTS's service to the cable mode, the at least one registration parameter specific to the second channel;

wherein the cable modem connects with the protection CMTS via the second channel using the loaded at least one registration parameter specific to the second channel;

wherein the obtained IP address is used for communications with both the working CMTS and the protection CMTS, wherein the protection CMTS takes over service to the cable modem without obtaining a new IP address for the cable modem.

15. The computer program product of claim 14, wherein the working CMTS is a routing CMTS.

16. The computer program product of claim 14, wherein the address space is outside a second subnet of IP addresses, the second subnet of IP addresses being dedicated to the protection CMTS for assignment to its cable modems.

17. The computer program product of claim 14, wherein the method further comprises communicating the obtained IP address for the cable modem to the protection CMTS.

18. The computer program product of claim 14, wherein the method further comprises injecting a host route to the cable modem into a routing protocol.

19. The computer program product of claim 18, wherein injecting the host route comprises providing the host route to one or more aggregation routers servicing the cable network.

20. The computer program product of claim 14, wherein the at least one registration parameter specific to the first channel comprises a transmission power, a transmission frequency, or transmission time slots at which the cable modem is to communicate with the working CMTS via the first channel.

21. The computer program product of claim 14, wherein the at least one registration parameter specific to the second channel comprises a transmission power, a transmission frequency, or transmission time slots at which the cable modem is to communicate with the protection CMTS via the second channel.

22. The computer program product of claim 14, wherein the cable modem sends a ranging request message to the protection CMTS after the determination of a failure of the working CMTS's service to the cable modem.

23. The computer program product of claim 14, wherein obtaining an IP address by the working CMTS for the cable modem comprises:
   requesting, by the working CMTS, an IP address for the cable modem from a provisioning server; and
   receiving, by the working CMTS, an IP address assigned to the cable modem from the provisioning server.

24. The computer program product of claim 23, wherein the provisioning server assigns an IP address for the cable modem using DHCP; and
   wherein the working CMTS performs a DHCP relay function.

25. The computer program product of claim 14, wherein obtaining an IP address by the working CMTS for the cable modem comprises:
   gleaning, by the working CMTS, an IP address assigned to the cable modem.

26. The computer program product of claim 14, wherein the method further comprises:
   recording, by the working CMTS, the obtained IP address.

27. A working CMTS for providing redundancy to a cable network in which a working CMTS provides normal service to a cable modem via a first channel and a protection CMTS provides protection service, by taking over service to the cable modem should normal service from the working CMTS become unavailable, via a second channel, the working CMTS comprising:
   a memory; and
   a processor configured to:
      receive a registration request from the cable modem;
      obtain an IP address for the cable modem, the IP address being obtained from an address space outside a first subnet of IP addresses;
      inform the cable modem of the obtained IP address; and
      inform the cable modem of at least one registration parameter specific to the first channel; and
   wherein the protection CMTS is configured to:
      inform the cable modem of at least one registration parameter specific to the second channel;
      take over service to the cable modem without obtaining a new IP address for the cable modem; and
   wherein the cable modem is configured to:
      pre-register, in response to being informed of the second channel, with the protection CMTS via the second channel;
      store the at least one registration parameter specific to the second channel in preparation for a failover event;
      load, in response to a determination of a failure of the working CMTS's service to the cable modem, the at least one registration parameter specific to the second channel;
      connect with the protection CMTS via the second channel using the loaded at least one registration parameter specific to the second channel;
   wherein the first subnet of IP addresses is dedicated to the working CMTS for assignment to its cable modems; and
   wherein the obtained IP address is used in communications with both the working CMTS and the protection CMTS.

28. The working CMTS of claim 27, wherein the working CMTS is a routing CMTS.

29. The working CMTS of claim 27, wherein the address space is outside a second subnet of IP addresses, the second subnet of IP addresses being dedicated to the protection CMTS for assignment to its cable modems.

30. The working CMTS of claim 27, wherein the working CMTS is further configured to communicate the obtained IP address for the cable modem to the protection CMTS.

31. The working CMTS of claim 27, wherein the working CMTS is further configured to inject a host route to the cable modem into a routing protocol.

32. The working CMTS of claim 31, wherein the injection of the host route comprises providing the host route to one or more aggregation routers servicing the cable network.

33. The working CMTS of claim 27, wherein the at least one registration parameter specific to the first channel comprises a transmission power, a transmission frequency, or transmission time slots at which the cable modem is to communicate with the working CMTS via the first channel.

34. The working CMTS of claim 27, wherein the at least one registration parameter specific to the second channel comprises a transmission power, a transmission frequency, or transmission time slots at which the cable modem is to communicate with the protection CMTS via the second channel.

35. The working CMTS of claim 27, wherein the cable modem is further configured to send a ranging request message to the protection CMTS after determining a failure of the working CMTS's service to the cable modem.

36. The working CMTS of claim 27, wherein obtaining an IP address by the working CMTS for the cable modem comprises:
   requesting, by the working CMTS, an IP address for the cable modem from a provisioning server; and
   receiving, by the working CMTS, an IP address assigned to the cable modem from the provisioning server.

37. The working CMTS of claim 36, wherein the provisioning server assigns an IP address for the cable modem using DHCP; and
   wherein the working CMTS is further configured to perform a DHCP relay function.

38. The working CMTS of claim 27, wherein obtaining an IP address by the working CMTS for the cable modem comprises:
   gleaning, by the working CMTS, an IP address assigned to the cable modem.

39. The working CMTS of claim 27, wherein the working CMTS is further configured to:
   record the obtained IP address.

* * * * *